(12) United States Patent
Saito

(10) Patent No.: US 9,110,298 B2
(45) Date of Patent: Aug. 18, 2015

(54) NAKED-EYE STEREOSCOPIC DISPLAY APPARATUS

(71) Applicant: JVC KENWOOD CORPORATION, Yokohama-shi, Kanagawa (JP)

(72) Inventor: Atsushi Saito, Yokohama (JP)

(73) Assignee: JVC KENWOOD CORPORATION, Yokohama-Shi, Kanagawa (JP)

( * ) Notice: Subject to any disclaimer, the term of this patent is extended or adjusted under 35 U.S.C. 154(b) by 185 days.

(21) Appl. No.: 13/855,352

(22) Filed: Apr. 2, 2013

(65) Prior Publication Data

US 2013/0265640 A1  Oct. 10, 2013

(30) Foreign Application Priority Data

Apr. 4, 2012  (JP) ................. 2012-085486

(51) Int. Cl.
  *G02B 27/10* (2006.01)
  *G02B 27/22* (2006.01)
  *H04N 13/04* (2006.01)
(52) U.S. Cl.
  CPC ........ *G02B 27/2214* (2013.01); *H04N 13/0404* (2013.01); *H04N 13/0415* (2013.01); *H04N 13/0422* (2013.01); *H04N 13/0447* (2013.01)
(58) Field of Classification Search
  CPC .......................... G02B 3/0056; G02B 27/2214
  USPC ............... 359/462–470, 619; 348/51
  See application file for complete search history.

(56) References Cited

U.S. PATENT DOCUMENTS

| 7,969,463 | B2 * | 6/2011 | Takaki ........................... 348/59 |
| 8,339,705 | B2 * | 12/2012 | Hong et al. .................... 359/463 |
| 2005/0259323 | A1 * | 11/2005 | Fukushima et al. .......... 359/462 |

FOREIGN PATENT DOCUMENTS

| JP | 09-236777 A | 9/1997 |
| JP | 2005-309374 A | 11/2005 |
| JP | 2006-048659 A | 2/2006 |

\* cited by examiner

*Primary Examiner* — Stephone B Allen
*Assistant Examiner* — Rahman Abdur
(74) *Attorney, Agent, or Firm* — Nath, Goldberg & Meyer; Jerald L. Meyer

(57) ABSTRACT

A naked-eye stereoscopic display apparatus satisfies $\theta=\arctan\{(Ax \cdot px)/(Ay \cdot py)\}$, $GF=Bx \cdot Lx/px$, $Ay \geq 2$ and $Bx \geq 2$, $Lx=\alpha \cdot px+\beta \cdot py \cdot \tan\theta$, and $GH=(\alpha \cdot px)^2+(\beta \cdot py)^2$. In these expressions, px is a pixel pitch in a horizontal direction, py is a pixel pitch in a vertical direction, Lx is a lens pitch of cylindrical lenses in the horizontal direction, $\theta$ is an inclination angle of cylindrical lenses, Ax and Ay are integers prime to each other, and $\alpha$ and $\beta$ are integers. Bx is a minimum natural number in which a numeric value GF becomes an integer. When $\alpha 0$ is defined as the value of $\alpha$ that minimizes the numeric value GF, $\alpha 0$ is not a multiple of the number of types of color pixels. When $Lx=\delta \cdot px$ is established, the naked-eye stereoscopic display apparatus satisfies $\tan\theta=(7-\delta) \cdot (px/py)$ and $5.3 \leq \delta \leq 5.4$.

1 Claim, 32 Drawing Sheets $(\tan \theta = (7-\delta) \cdot (px/py), \delta = 5.1)$ $(\tan\theta = (7-\delta)\cdot(px/py), \delta = 5.2)$ FIG. 13A  (tan $\theta = (7-\delta) \cdot (px/py)$, $\delta = 5.3$)
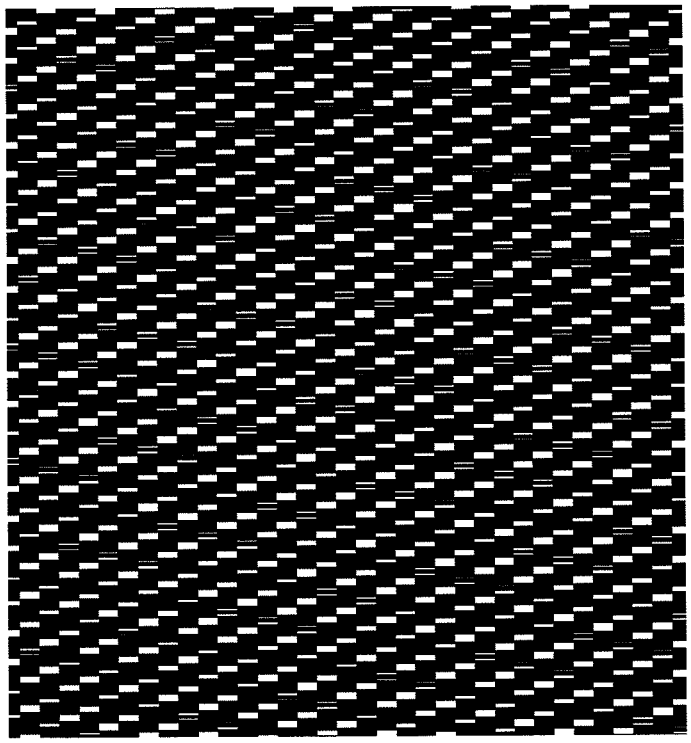
FIG. 13B
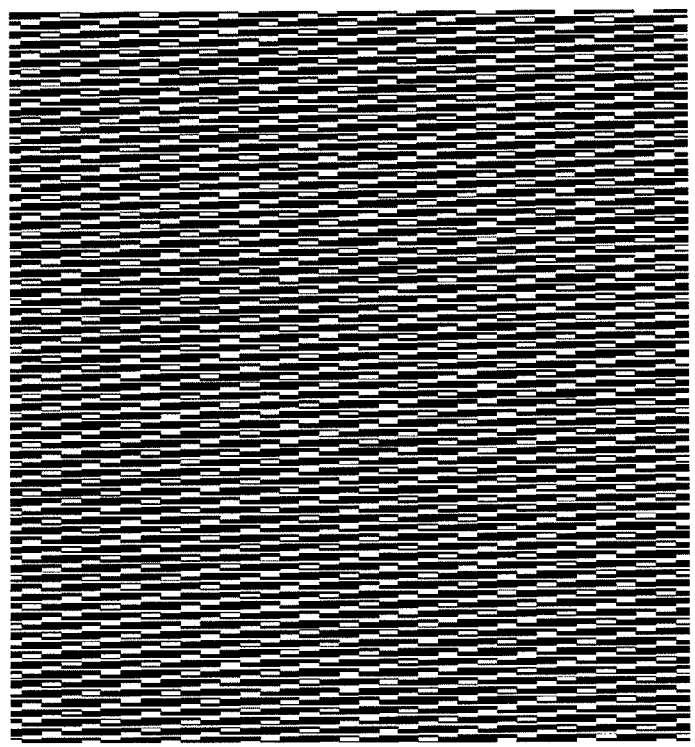

$(\tan \theta = (7-\delta) \cdot (px/py), \delta = 5.4)$

FIG. 15A  $(\tan\theta = (7-\delta)\cdot(px/py), \delta = 5.5)$
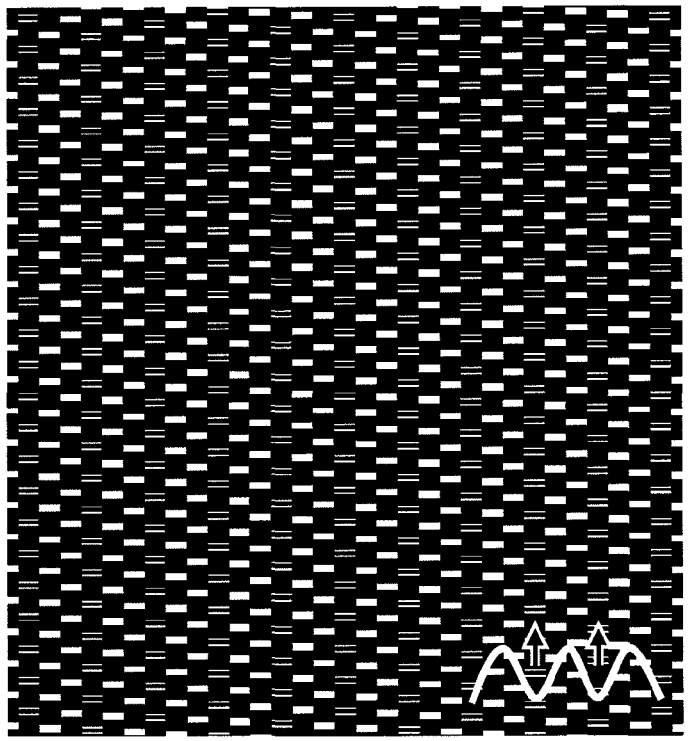
FIG. 15B
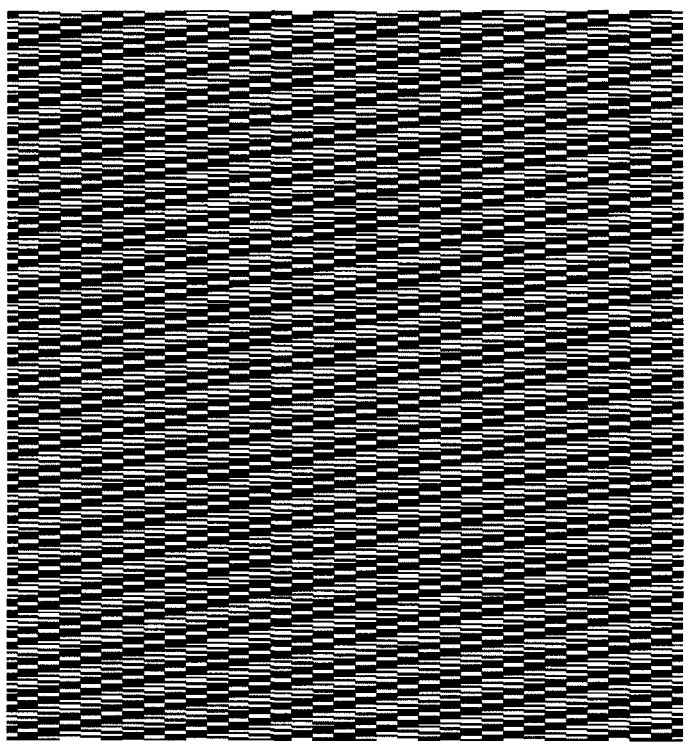

$(\tan\theta = (7-\delta)\cdot(px/py), \delta = 5.6)$

FIG. 17

| δ | R,G,B | LUMINANCE |
|---|---|---|
| 5.1 | GOOD | MOIRE OCCURS |
| 5.2 | GOOD | MOIRE OCCURS |
| 5.3 | GOOD | GOOD |
| 5.4 | GOOD | GOOD |
| 5.5 | MOIRE OCCURS | GOOD |
| 5.6 | MOIRE OCCURS | GOOD |

$(\tan\theta = 0.5 \cdot (8-\delta) \cdot (px/py), \delta = 5.1)$ $(\tan \theta = 0.5 \cdot (8-\delta) \cdot (px/py), \delta = 5.2)$ $(\tan \theta = 0.5 \cdot (8-\delta) \cdot (px/py), \delta = 5.3)$ $(\tan \theta = 0.5 \cdot (8 - \delta) \cdot (px/py), \delta = 5.4)$ $(\tan\theta = 0.5 \cdot (8-\delta) \cdot (px/py), \delta = 5.5)$

FIG. 23

| δ | R,G,B | LUMINANCE |
|---|---|---|
| 5.1 | GOOD | GOOD |
| 5.2 | GOOD | GOOD |
| 5.3 | GOOD | GOOD |
| 5.4 | GOOD | GOOD |
| 5.5 | MOIRE OCCURS | GOOD |

$(\tan \theta = 0.5 \cdot (11 - \delta) \cdot (px/py), \delta = 8.5)$ $(\tan \theta = 0.5 \cdot (11 - \delta) \cdot (px/py), \delta = 8.6)$ $(\tan\theta = 0.5 \cdot (11-\delta) \cdot (px/py), \delta = 8.7)$ $(\tan\theta = 0.5 \cdot (11-\delta) \cdot (px/py), \delta = 8.8)$ $(\tan\theta = 0.5 \cdot (11-\delta) \cdot (px/py), \delta = 8.9)$

| δ | R,G,B | LUMINANCE |
|---|---|---|
| 8.5 | MOIRE OCCURS | GOOD |
| 8.6 | GOOD | GOOD |
| 8.7 | GOOD | GOOD |
| 8.8 | GOOD | MOIRE OCCURS |
| 8.9 | GOOD | MOIRE OCCURS |

FIG. 31

| PARAMETER | $\delta$ | 5.375 |
|---|---|---|
| HORIZONTAL PIXEL PITCH | px | 0.1 |
| VERTICAL PIXEL PITCH | py | 0.3 |
| INCLINATION ANGLE | $\theta$ | 28.44 |
| LENS PITCH | L | 0.473 |
| PARAMETER | $\alpha 0$ | 7 |
| PARAMETER | $\beta 0$ | -1 |
| PARAMETER | Ax | 13 |
| PARAMETER | Ay | 8 |
| PARAMETER | Bx | 8 |
| NUMBER OF DIVISIONS OF PARALLAX IMAGES | V | 43 |

FIG. 33A                    FIG. 33B
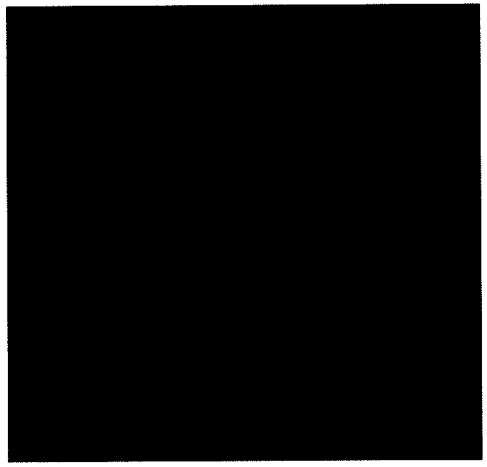
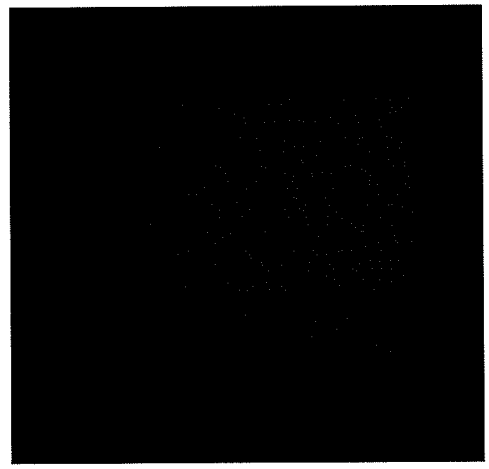
FIG. 34
| PARAMETER | $\delta$ | 5.25 |
|---|---|---|
| HORIZONTAL PIXEL PITCH | px | 0.1 |
| VERTICAL PIXEL PITCH | py | 0.3 |
| INCLINATION ANGLE | $\theta$ | 24.62 |
| LENS PITCH | L | 0.477 |
| PARAMETER | $\alpha 0$ | 8 |
| PARAMETER | $\beta 0$ | -2 |
| PARAMETER | Ax | 11 |
| PARAMETER | Ay | 8 |
| PARAMETER | Bx | 4 |
| NUMBER OF DIVISIONS OF PARALLAX IMAGES | V | 42 |

FIG. 36A
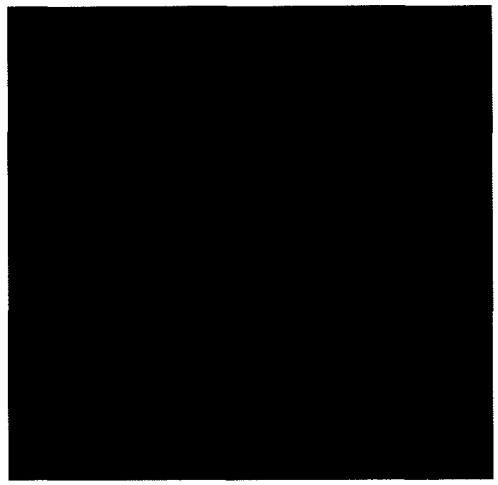
FIG. 36B
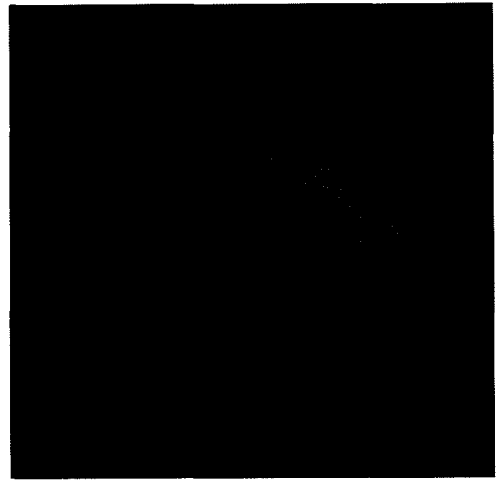
FIG. 37
| PARAMETER | δ | 8.625 |
|---|---|---|
| HORIZONTAL PIXEL PITCH | px | 0.1 |
| VERTICAL PIXEL PITCH | py | 0.3 |
| INCLINATION ANGLE | θ | 21.6 |
| LENS PITCH | L | 0.802 |
| PARAMETER | α0 | 11 |
| PARAMETER | β0 | -2 |
| PARAMETER | Ax | 19 |
| PARAMETER | Ay | 16 |
| PARAMETER | Bx | 8 |
| NUMBER OF DIVISIONS OF PARALLAX IMAGES | V | 138 |

NAKED-EYE STEREOSCOPIC DISPLAY APPARATUS

CROSS REFERENCE TO RELATED APPLICATION

This application is based upon and claims the benefit of priority under 35 U.S.C. §119 from Japanese Patent Applications No. P2012-085486, filed on Apr. 4, 2012, the entire contents are incorporated herein by reference.

BACKGROUND

The embodiment relates to a naked-eye stereoscopic display apparatus having a parallax in a single dimension.

There are known technologies, in which an image on a display device such as a printing surface or a liquid crystal panel is divided into a plurality of viewpoint directions by using a special optical member such as a lenticular lens, a slit-like barrier or a lens array. Thereby, the displayed image changes according to the position of the viewer. In particular, display images (parallax images) of a same object, which are different from each other and have a specific parallax therebetween, are set to be inputted to the right eye and the left eye. In such a way, a stereoscopic display apparatus can be realized which enables the person to achieve stereoscopic vision without the need to wear special eyeglasses (hereinafter, the stereoscopic display apparatus is referred to as a "naked-eye stereoscopic display apparatus"). Note that, in this application, the direction in which the parallax images are divided is set to a single dimension in the horizontal direction.

In the case of achieving stereoscopic vision of the image in the naked-eye stereoscopic display apparatus, there is a requirement that the number of viewpoints be increased by dividing the display image as finely as possible. This is in order to expand the visual recognition range in which stereoscopic vision can be achieved, and to obtain natural stereoscopic vision and smooth motion parallax, which are worthy of long-time viewing.

Recently, for the purpose of enhancing visual attraction and visibility, application of such stereoscopic vision by parallax images to digital signage, car navigation, and the like has been studied. In the case of considering such application, there is a requirement that natural stereoscopic vision be realized by dividing the parallax images as finely as possible even in the case of using a low-resolution display device.

In order to satisfy these requirements a multi-eye type is effective, in which the viewpoints are not divided by assuming positions of eyes of an observer who observes the display device, but instead viewpoints are divided as finely as possible, and the observer views the display device at any viewpoint among the finely divided viewpoints. In order to increase the number of the parallax images, it is effective to increase the lens pitch with respect to the pixel pitch of the display device.

However, owing to a magnification effect of the lens, as the lens pitch increases color pixels look larger, and accordingly, a resolution feeling of the parallax images in the pitch direction of the lens is significantly lowered. In such a way, a malfunction occurs in that the resolution of the parallax images differs between the horizontal direction and the vertical direction.

On this subject, in Japanese Patent Laid-Open Publication No. H09-236777 (Patent Document 1), the lenticular lens is inclined with respect to the pixel array, whereby one three-dimensional pixel is composed by using not only pixels in the horizontal direction but also pixels in the vertical direction. It is reported that, in such a way, lowering of the resolution in the horizontal direction in three-dimensional displays can be suppressed, and a balance of the resolution between the horizontal direction and the vertical direction can be enhanced.

Meanwhile, in terms of cost and coexistence with two-dimensional displays, there is required a naked-eye stereoscopic display apparatus using an already widespread display device, which is composed of color pixels of R (red), G (green) and B (blue), and that has pixels of the same color arrayed regularly in the vertical direction.

In Japanese Patent Laid-Open Publication No. 2005-309374 (Patent Document 2) and Japanese Patent Laid-Open Publication No. 2006-48659 (Patent Document 3), an inclination angle of the lenticular lens with respect to the display device is conceived, and three types of color pixels are uniformly used with respect to the horizontal direction. It is reported that, in such a way, even in the case of using a display device in which the horizontally different color pixels (for example, the R, G and B pixels) are vertically arrayed in a stripe pattern, color unevenness and luminance unevenness can be reduced.

Moreover, in FIG. 1 of Patent Document 2, a configuration is introduced in which the pitch of the lenticular lens is set at 7/2 times the pixel pitch, and 7 parallax images are divided in the horizontal direction across two lenses. When the lens pitch is shifted from integral multiples of the pixel pitch as described above, the parallax images can be divided finely in many directions even if the pitch of the lens is small, and accordingly, the above-mentioned problems can be solved, and the above-mentioned requirements can be satisfied.

SUMMARY

However, when the lens pitch of the lenticular lens in the horizontal direction is shifted from the integral multiples of the pixel pitch, a plurality of the parallax images are divided across a plurality of cylindrical lenses, and as shown below, there is a problem that noise in a form of parallel oblique lines is generated on lens boundary lines.

FIG. 1 shows a relationship between an arrangement of rectangular color pixels 53 (included as part of a display device), and cylindrical lenses 52a and 52b (also included as part of the display device). Here, oblique lines are boundary lines bl1 to bl3 of the adjacent cylindrical lenses 52a and 52b. Numerals (1 to 7) assigned to the respective pixels 53 denote numbers of the parallax images, and the numbers correspond to directions in the event of dividing and presenting the parallax images in the horizontal direction.

FIG. 2 is a top view of a naked-eye stereoscopic display apparatus 50, showing directions of parallax images SP1 to SP7, which correspond to the cylindrical lenses 52a and 52b.

The horizontal lens pitch is 7/2 times the horizontal pixel pitch, the cylindrical lens 52a corresponds to the parallax images SP2, SP4 and SP6, and the cylindrical lens 52b corresponds to the parallax images SP1, SP3, SP5 and SP7. That is to say, the parallax images SP1 to SP7 are divided across the two cylindrical lenses 52a and 52b. Here, when being seen through the cylindrical lenses 52a and 52b, the color pixels 53 corresponding to the respective parallax images appear to expand in the direction of the lens pitch.

Hence, in the case of observing the parallax image SP1, as shown in FIG. 3, the color pixels 53 corresponding to the parallax image SP1 are present on the cylindrical lens 52b, but are not present on the cylindrical lens 52a. Therefore, the parallax image SP1 can be seen through the cylindrical lens 52b, but the parallax image SP1 cannot be seen through the cylindrical lens 52a.

Hence, with regard to the parallax image SP1 across the whole of the image, noise in the form of the oblique lines parallel to the boundary lines bl1 to bl3 of the cylindrical lenses 52a and 52b is generated. In actual fact, on the cylindrical lens 52a, the parallax image SP7 and an intermediate image of the parallax image SP2 are seen.

Therefore, in the case where, pixel values of the color pixels corresponding to the parallax image SP1 and the parallax images SP2 and SP7 are different from each other, the aforementioned oblique line-like noise is generated. Moreover, in the case of dividing the parallax images across many cylindrical lenses, color pixels corresponding thereto are not present in more cylindrical lenses, and the number of cylindrical lenses through which the parallax images cannot be seen is increased, and accordingly, the oblique line-like noise is generated far more significantly.

FIG. 4 shows a parallax image obtained by simulating the case where the parallax images are observed from a certain point. Note that an inclination of the cylindrical lenses with respect to the pixel pitch direction is set at 9.46° ($\approx$ arctan (1/6)), and the lens pitch in the horizontal direction is set at 61/8=7.625 times the pixel pitch therein. This parallax image is divided into 61 parallax images across 8 cylindrical lenses. A vertical pixel pitch of the display device is set at 3 times the horizontal pixel pitch.

It is understood that, in locations where there is a switch from one parallax image to the next, the oblique line-like noise is generated along the boundary lines of the cylindrical lenses. It is required that the oblique line-like noise be suppressed.

Moreover, in some cases, moire occurs in the image due to a particular physical relationship between the lenticular lens (cylindrical lenses) and the display device, and it is also required that the moire be suppressed.

In order to cope with the requirements as described above, it is an object of the embodiment to provide a naked-eye stereoscopic display apparatus, which is capable of suppressing the oblique line-like noise, and further, is capable of suppressing the moire in a case where the lens pitch of the lenticular lens in the horizontal direction is shifted from the integral multiples of the pixel pitch in the horizontal direction, and where the plurality of parallax images are divided across the plurality of cylindrical lenses.

In order to solve the above-mentioned problems inherent in the conventional technology, an aspect of the embodiment provides a naked-eye stereoscopic display apparatus including: a two-dimensional display (11) in which color pixels (13) are arrayed individually in a horizontal direction and a vertical direction, and color pixels of same color are arrayed in the vertical direction; and a lenticular sheet (14) having a plurality of cylindrical lenses (12, 12a to 12d) arrayed in parallel to one another, the lenticular sheet being arranged on the two-dimensional display so that viewpoint images displayed on the color pixels are observed through the cylindrical lenses, wherein, when a pixel pitch in the horizontal direction of the color pixels is defined as px, a pixel pitch in the vertical direction of the color pixels is defined as py, a lens pitch of the cylindrical lenses in a horizontal direction is defined as Lx, an inclination angle of boundary lines among the cylindrical lenses with respect to the vertical direction of the two-dimensional display is defined as θ, types of the color pixels are a natural number of 3 or more defined as D, Ax and Ay are integers prime to each other, and α and β are integers, then Expressions (1) to (5) are satisfied:

$$\theta = \arctan\{(Ax \cdot px)/(Ay \cdot py)\} \quad (1)$$

$$GF = Bx \cdot Lx/px \quad (2)$$

$$Ay \geq 2 \text{ and } Bx \geq 2 \quad (3)$$

$$Lx = \alpha \cdot px + \beta \cdot py \cdot \tan\theta \quad (4)$$

$$GH = (\alpha \cdot px)^2 + (\beta \cdot py)^2 \quad (5)$$

where Bx is a minimum natural number in which a numeric value GF shown in Expression (2) becomes an integer, and α0 is not a multiple of D where α0 is defined as the value of α that minimizes the numeric value GH shown in Expression (5), and when δ is defined as a number that satisfies Expression (6), then any of Expression (7) to Expression (9) is satisfied:

$$Lx = \delta \cdot px \quad (6)$$

$$\tan\theta = (7-\delta) \cdot (px/py) \text{ and } 5.3 \leq \delta \leq 5.4 \quad (7)$$

$$\tan\theta = 0.5 \cdot (8-\delta) \cdot (px/py) \text{ and } 5.1 \leq \delta \leq 5.4 \quad (8)$$

$$\tan\theta = 0.5 \cdot (11-\delta) \cdot (px/py) \text{ and } 8.6 \leq \delta \leq 8.7 \quad (9)$$

BRIEF DESCRIPTION OF THE DRAWINGS

FIG. 13A is a view showing a simulation result as to whether or not the moire occurs on the color in a case where tan θ=(7−δ)·(px/py) and δ=5.3.

FIG. 13B is a view showing a simulation result as to whether or not the moire occurs on the luminance in the case where tan θ=(7−δ)·(px/py) and δ=5.3.

FIG. 15A is a view showing a simulation result as to whether or not the moire occurs on the color in a case where tan θ=(7−δ)·(px/py) and δ=5.5.

FIG. 15B is a view showing a simulation result as to whether or not the moire occurs on the luminance in the case where tan θ=(7−δ)·(px/py) and δ=5.5.

FIG. 17 is a view showing a summary of the simulation results in the case where tan θ=(7−δ)·(px/py).

FIG. 23 is a view showing a summary of the simulation results in the case where tan θ=0.5·(8−δ)·(px/py).

FIG. 31 is a table showing values of respective parameters of the naked-eye stereoscopic display apparatus of Example 1.

FIG. 33A and FIG. 33B are simulation images showing a state when parallax images divided into 43 pieces are observed from one point through cylindrical lenses.

FIG. 34 is a table showing values of respective parameters of a naked-eye stereoscopic display apparatus of Example 2.

FIGS. 36A and 36B are simulation images showing a state when 42 parallax images are observed from one point through the cylindrical lenses.

FIG. 37 is a table showing values of respective parameters of a naked-eye stereoscopic display apparatus of Example 3.

DETAILED DESCRIPTION

Figure 1:
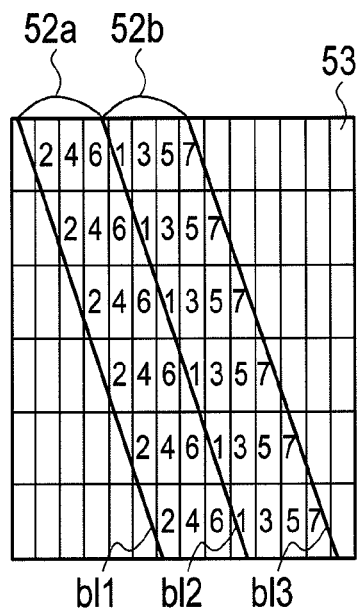
FIG. 1 is a view for explaining that noise is generated in a form of oblique lines parallel to boundary lines of lenticular lenses for the shown arrangement of color pixels and cylindrical lenses.
Figure 2:
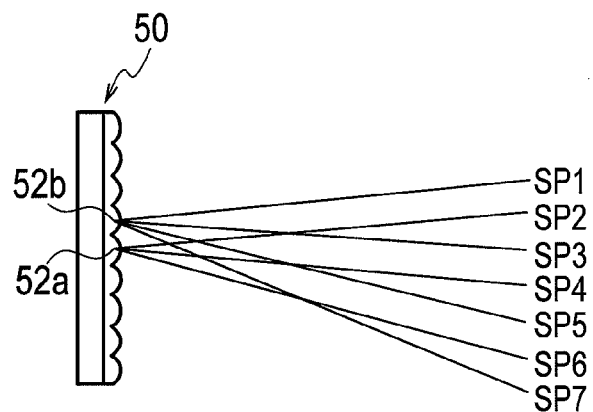
FIG. 2 is a view for explaining that the noise in the form of the oblique lines parallel to the boundary lines of the lenticular lens is generated, which is a top view of a naked-eye stereoscopic display apparatus, showing directions of parallax images corresponding to the cylindrical lenses.
Figure 3:
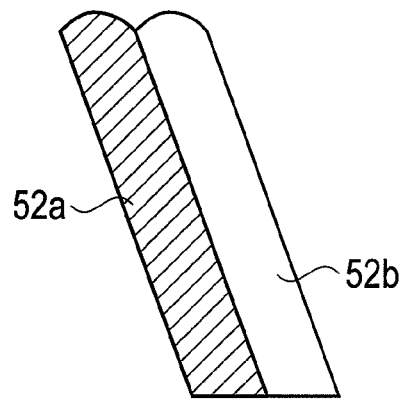
FIG. 3 is a view for explaining that the noise in the form of the oblique lines parallel to the boundary lines of the lenticular lens is generated, showing that color pixels corresponding to a certain parallax image are present only on one of two cylindrical lenses.

A description is made below of a naked-eye stereoscopic display apparatus of an embodiment with reference to the accompanying drawings. In the description referring to the drawings, the same reference numerals are assigned to the same portions.

Figure 5:
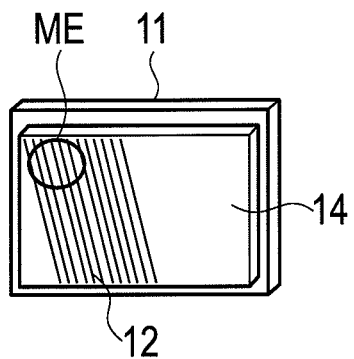
FIG. 5 is a perspective view showing an entire configuration of a naked-eye stereoscopic display apparatus of an embodiment of the present invention.
Figure 6:
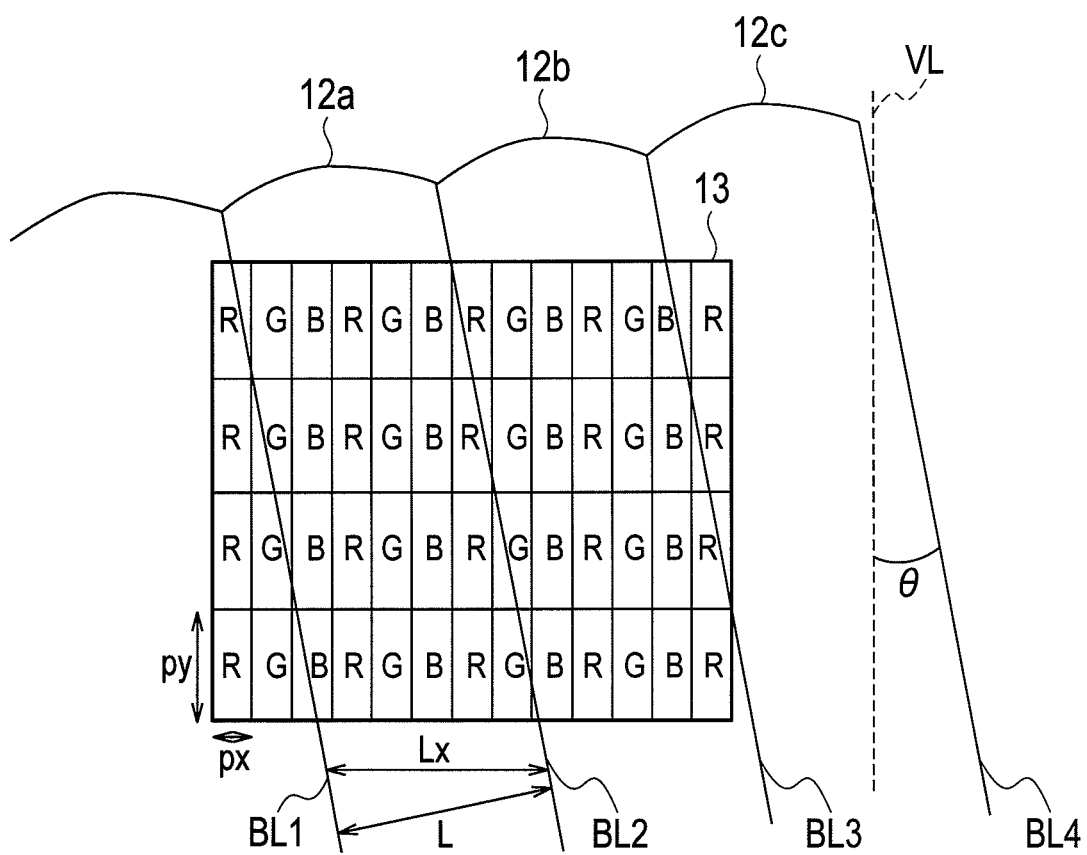
FIG. 6 is a view in which a region ME of FIG. 5 is enlarged, and is a plan view showing the naked-eye stereoscopic display apparatus of the embodiment.

By using FIG. 5 and FIG. 6, a description follows of a configuration of a naked-eye stereoscopic display apparatus of one embodiment. The naked-eye stereoscopic display apparatus of the embodiment includes: a two-dimensional display 11 in which color pixels 13 are arrayed at predetermined pitches individually in a vertical direction and a horizontal direction; and a lenticular sheet 14 arranged on a display surface of the two-dimensional display 11.

The lenticular sheet 14 is composed of a plurality of cylindrical lenses 12a, 12b, 12c . . . arrayed in a single dimension in parallel to one another. The color pixels 13 are visually recognized through the plurality of cylindrical lenses 12. Boundary lines BL1 to BL4 among the cylindrical lenses 12 form straight lines parallel to one another, and are inclined with respect to the vertical direction VL of the two-dimensional display 11. The inclination angle of the boundary lines BL1 to BL4 is defined as θ.

A plurality of rectangles in FIG. 6, which are arrayed in the vertical direction and the horizontal direction, individually indicate the color pixels 13 of the two-dimensional display 11. In the two-dimensional display 11, the color pixels 13 of three (=D) different colors which are R, G and B are arrayed periodically in the horizontal direction, such that color pixels of the same color are arrayed in the vertical direction. Note that a lens pitch of the cylindrical lenses 12 in a direction perpendicular to the boundary lines BL1 to BL4 (hereinafter, such a lens pitch is simply referred to as a lens pitch) is defined as L, and a lens pitch of the cylindrical lenses 12 in a horizontal direction (hereinafter, such a lens pitch is simply referred to as a horizontal pitch) is defined as Lx.

A pixel pitch in the horizontal direction of the color pixels 13 (hereinafter, such a pixel pitch is referred to as a horizontal pixel pitch) is defined as px, and a pixel pitch in the vertical direction of the color pixels 13 (hereinafter, such a pixel pitch is referred to as a vertical pixel pitch) is defined as py. In the following description, py/px is defined to be equal to 3 (py/px=3); however, py/px may be numeric values other than 3.

The cylindrical lenses 12a, 12b, 12c . . . refract light only in the direction perpendicular to the boundary lines BL1 to BL4. The horizontal lens pitch Lx is given by Expression (6) below and indicates the number of pixels between each cylindrical lens 12.

$$Lx = \delta \cdot px \quad (6)$$

Note that Expression (6) is converted into L=δ·px·cos θ.

Next follows a description of a method for dividing parallax images more finely without increasing a resolution of the two-dimensional display 11.

Figure 7:
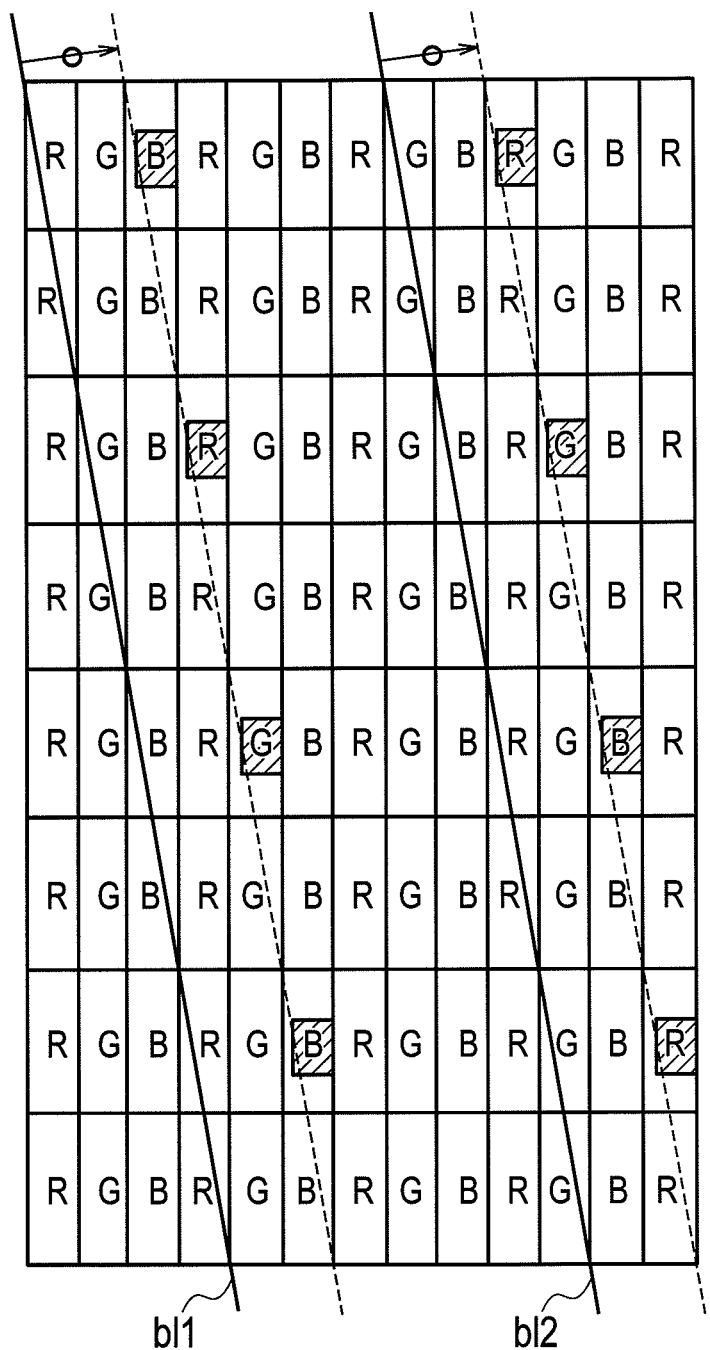
FIG. 7 is a plan view showing a first comparative example, in which an inclination angle θ of cylindrical lenses is set at 9.46°, and a horizontal lens pitch Lx is set at 7 times (δ=7) a horizontal pixel pitch px.

FIG. 7 shows a first comparative example, in which an inclination angle θ of the cylindrical lenses is set as θ=arctan (px/(2·py))=9.46°, δ is set equal to 7 (δ=7), and the horizontal lens pitch Lx is set as Lx=7·px. When the color pixels of the two-dimensional display 11 are viewed from a certain direction through the cylindrical lens, only color pixels located at an equal distance from the boundary lines bl1 and bl2 among the cylindrical lenses are seen. The distance of such visible color pixels from the boundary lines bl1 and bl2 changes according to the viewing direction.

The three types (R, G, B) of color pixels appear periodically along the boundary line bl1, and consequently, the respective color pixels are uniformly used in the display surface of the two-dimensional display 11.

However, in the first comparative example of FIG. 7, the horizontal lens pitch Lx is an integral multiple of the horizontal pixel pitch px, and accordingly, even if the color pixels are scanned horizontally, relative positions between the boundary lines bl1 and bl2 and the color pixels of the two-dimensional display 11 cannot be divided to a width of the horizontal pixel pitch px or less.

Accordingly, as mentioned above, the horizontal lens pitch Lx is shifted from the integral multiple of the horizontal pixel pitch px, that is, δ=Lx/px is set at a value other than an integer, whereby the relative positions of the boundary line bl1 to the color pixels of the two-dimensional display 11 are divided to the width of the horizontal pixel pitch px or less.

In such a way, a plurality of the parallax images are divided across the plurality of cylindrical lenses, and can be thereby divided into a large number of parallax images without increasing the resolution of the two-dimensional display 11.

Figure 8:
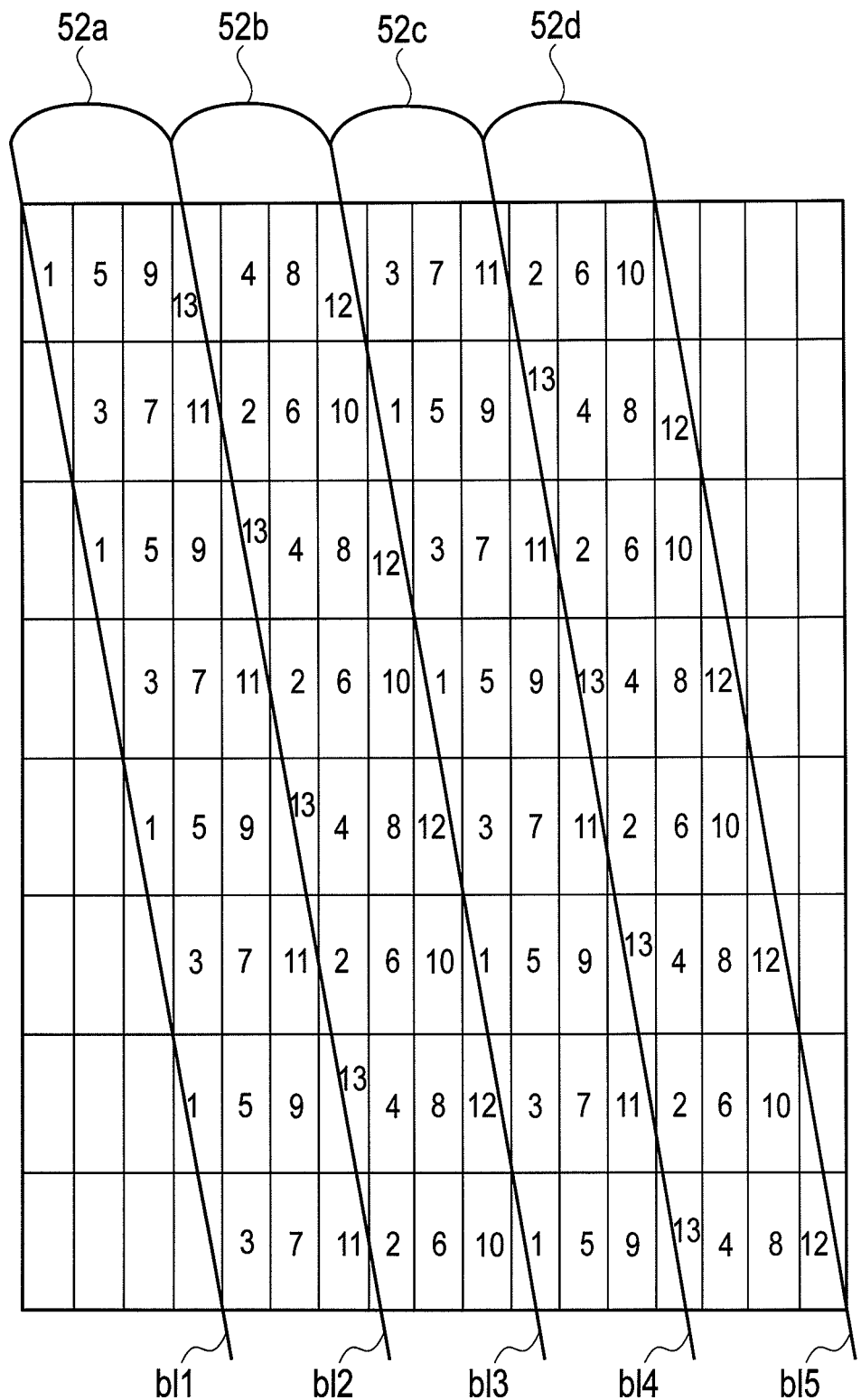
FIG. 8 is a plan view showing a second comparative example, in which the inclination angle θ is set at 9.46°, and the horizontal lens pitch Lx is set at 13·px/4=3.25·px (δ=3.25).

FIG. 8 shows a second comparative example, in which θ=9.46° and δ=3.25 are set, and the horizontal lens pitch Lx (=L/cos θ) is set at 13·px/4=3.25·px. Numerals assigned to the respective color pixels denote numbers of the 13 different parallax images. Such 13 parallax images are divided across two cylindrical lenses 52a and 52b.

However, in the second comparative example, there is a malfunction that noise in a form of oblique lines parallel to the boundary lines bl1 to bl5 of the cylindrical lenses 52a to 52d is generated.

Seeing FIG. 8, the cylindrical lenses 52a and 52c correspond only to parallax images of odd numbers, and the cylindrical lenses 52b and 52d correspond only to parallax images of even numbers. Hence, the parallax images of odd numbers are not displayed on the cylindrical lenses 52b and 52d, and the parallax images of even numbers are not displayed on the cylindrical lenses 52a and 52c.

Hence, in the case where parallax images SP1 to SP13 having a parallax in the horizontal direction are allowed to sequentially correspond to the above-described configuration, the noise in the form of the oblique lines parallel to the boundary lines bl1 to bl5 of the cylindrical lenses 52a to 52d is generated. Moreover, in the case where the horizontal lens pitch Lx is adjusted, and the parallax images are divided more finely, then a number of undisplayed viewpoints is increased for each individual cylindrical lens, and accordingly, such oblique line-like noise becomes significant.

To counteract this, in the embodiment, the inclination angle θ of the cylindrical lenses 52a to 52d is set appropriately, whereby all of the parallax images SP1 to SP13 can be displayed on one of the cylindrical lenses 52a to 52d at least once without fail.

In such a way, even in the case where the horizontal lens pitch Lx is shifted from the integral multiple of the horizontal pixel pitch px, and the parallax images are presented in directions divided across the plurality of cylindrical lenses 52a to 52d, then across the whole of the parallax image, the noise in the form of the oblique lines parallel to the boundary lines bl1 to bl5 of the cylindrical lenses 52a to 52d can be suppressed.

Figure 9:
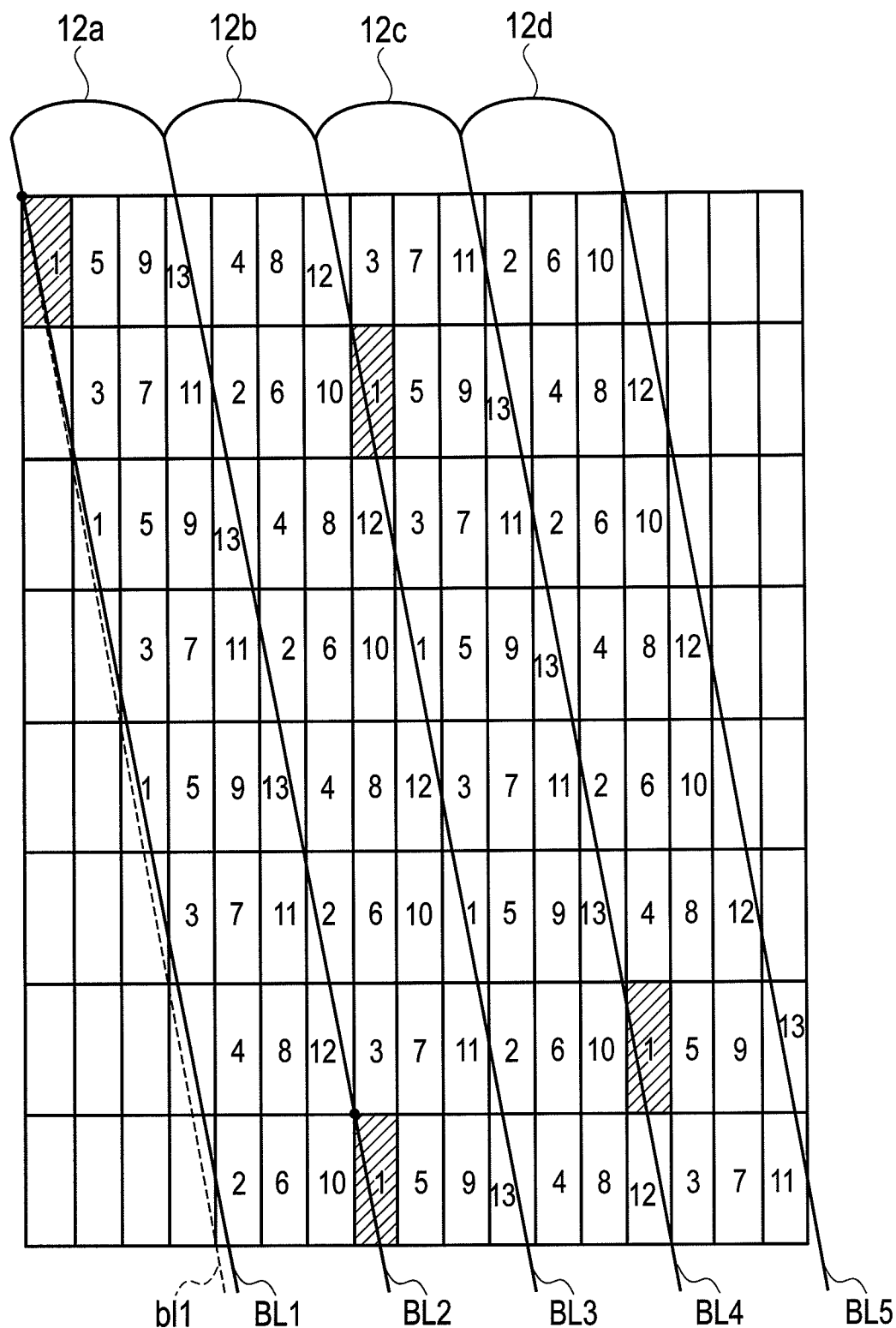
FIG. 9 is a plan view showing an embodiment in a case where the inclination angle θ is set at 10.23°, and the horizontal lens pitch Lx is set at 3.25 times the horizontal pixel pitch px.

FIG. 9 shows one embodiment in a case where θ=10.23°, δ=3.25 and Lx=3.25·px are set. In the example shown in FIG. 9, all of the parallax images 1 to 13 appear on all of cylindrical lenses 12a to 12d. In such a way, the oblique line-like noise in the second comparative example shown in FIG. 8 can be suppressed.

Specifically, the horizontal pixel pitch px, the vertical pixel pitch py, the horizontal lens pitch Lx of the cylindrical lenses 12a to 12d, and such an inclination angle θ of boundary lines BL1 to BL5 among the cylindrical lenses 12a to 12d just need to satisfy all of relational expressions shown in Expression (1), Expression (2) and Expression (3). Here, Ax and Ay are integers prime to each other, and Bx is a minimum natural number in which numeric value GF shown in Expression (2) becomes an integer.

$$\theta = \arctan\{(Ax \cdot px)/(Ay \cdot py)\} \qquad (1)$$

$$GF = Bx \cdot Lx/px \qquad (2)$$

$$Ay \geq 2 \text{ and } Bx \geq 2 \qquad (3)$$

In the case where px, py, Lx and θ satisfy the relational expressions shown in Expression (1) to Expression (3), a number V of maximum dividable parallax images is represented by Expression (10). Here, {Bx, Ay} indicates a least common multiple of Bx and Ay.

$$V = \{Bx, Ay\} \cdot Lx/px \qquad (10)$$

The condition of Bx≥2 in Expression (3) is satisfied, whereby the horizontal lens pitch Lx can be shifted from the integral multiple of the horizontal pixel pitch px, that is, δ can be set at a value other than an integer. In such a way, the parallax images can be divided across the plurality of cylindrical lenses 12a to 12d, and the number of divisions of the parallax images can be increased without increasing the horizontal lens pitch Lx with respect to the horizontal pixel pitch px. Based on Expression (2), Bx is a value related to the horizontal lens pitch Lx.

However, if Ay is an integral multiple of Bx, then {Bx, Ay}=Ay is established in Expression (10), and the number V of the parallax images to be divided tends not to depend on Bx. Hence, all of the parallax images will be displayed on all of the cylindrical lenses 12a to 12d at least once without fail.

In such a way, even in the case where the horizontal lens pitch Lx is shifted from the integral multiple of the horizontal pixel pitch px, and the parallax images are divided across the plurality of cylindrical lenses 12a to 12d, then across the whole of the parallax image, the noise in the form of the oblique lines parallel to the boundary lines BL1 to BL5 of the cylindrical lenses 12a to 12d can be suppressed.

Moreover, when the color pixels of the two-dimensional display 11 are observed through the cylindrical lenses 12a to 12d, the color pixels are magnified, and the resolution feeling of the parallax images is damaged. A size of the magnified color pixels is proportional to the lens pitch L and 1/tan θ. When θ is reduced, the size of the color pixels is increased, and the resolution of the parallax images is lowered.

Accordingly, preferably, Ax/Ay≥1 is established, whereby θ is not reduced too much even in the case where Bx and Ay are increased. Hence, the lowering of the resolution can be suppressed.

Moreover, in some cases, color unevenness occurs on the respective parallax images V, depending on values of the lens pitch L and the inclination angle θ. A method for suppressing the color unevenness is explained below.

Specifically, in the case where, among possible integers α and β which satisfy Expression (4), α and β values in which GH of Expression (5) becomes minimum, are defined as α0 and β0, the respective numeric values of px, py, Lx and θ are set so that α0 cannot be a multiple of D. D is the number of colors displayable by the color pixels of the two-dimensional display 11. Here, the two-dimensional display 11 is configured such that three colors, which are R, G and B, are arrayed periodically, and accordingly, α0 just needs not be a multiple of 3.

$$Lx = \alpha px + \beta \cdot py \cdot \tan \theta \qquad (4)$$

$$GH = (\alpha \cdot px)^2 + (\beta \cdot py)^2 \qquad (5)$$

Figure 10:
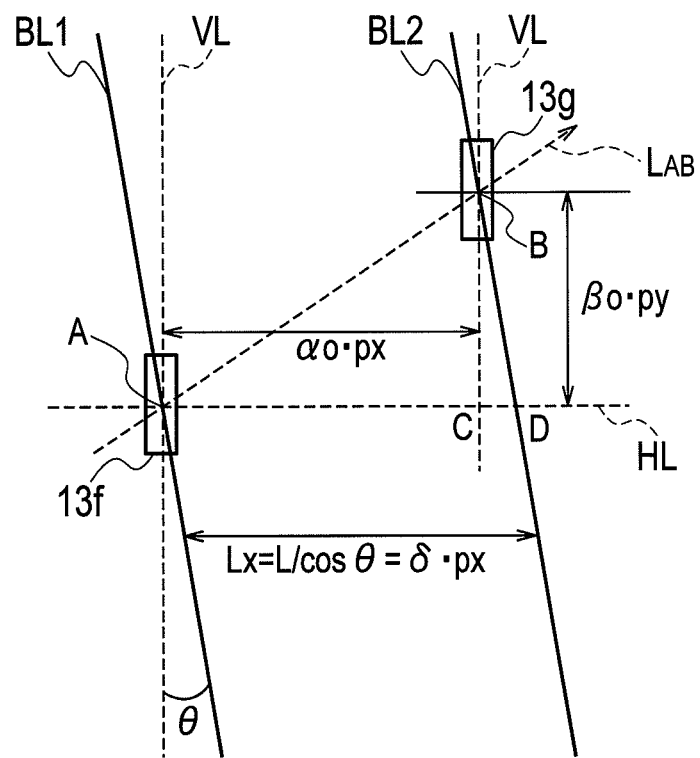
FIG. 10 is a schematic view for explaining conditions which respective parameters should meet in order to suppress color unevenness.

Expression (4) and Expression (5) are explained by using FIG. 10. FIG. 10 shows two certain color pixels 13f and 13g and the boundary lines BL1 and BL2 among the cylindrical lenses 12. The boundary line BL1 passes through the center A of the color pixel 13f, and the boundary line BL2 passes through the center B of the color pixel 13g. When attention is paid to triangles BAC and BCD, it is understood that it is necessary that Expression (4) be satisfied for the natural numbers α and β. Moreover, it is understood that α0 just needs to not be the multiple of 3 in order that the color pixel 13f and the color pixel 13g can be different in color from each other.

When the display surface of the two-dimensional display 11 is seen through the cylindrical lenses 12, different colors, which are R, G, B, R... or R, B, G, R..., will be always seen sequentially in line along a straight line LAB. A length (GH$^{1/2}$) of a line segment that connects the center A and the center B to each other is a relative distance between the color pixels 13f and 13g. α0 and β0 are selected so as to minimize this relative distance. Hence, such R, G and B color pixels are arrayed sequentially in a small cycle (3×GH$^{1/2}$) in a direction of such a straight line AB. Hence, the color unevenness can be suppressed.

Moreover, if the configuration is adopted as described above, the respective color pixels 13f and 13g become color pixels which compose the same parallax image. That is to say, the color pixels which compose the same parallax image are present without fail on the lenses adjacent to each other, and accordingly, all of the parallax images are displayed on all of the cylindrical lenses at least once without fail.

Note that the embodiment shows the case of using the two-dimensional display 11 in which the color pixels of the three colors (R, G, B) are arrayed periodically in the horizontal direction. However, also in a case where different colored pixels of four or more color types (such as if Y (yellow) or the like is added), are arrayed periodically in the horizontal direction, the color unevenness can be suppressed if the numeric value of the above-described α0 is not the multiple of the number (D) of colors.

Moreover, there is a case where moire occurs in the image due to a particular physical relationship between the lenticular sheet 14 (lenticular lens) and the two-dimensional display 11 (display device). The moire occurs depending on relationships between the lenticular sheet 14 and all of the color pixels in the two-dimensional display 11.

Specifically, the moire occurs depending on a relationship between the color pixels of the same color and the lenticular sheet, and on a relationship between black stripes of the two-dimensional display 11 and the lenticular sheet 14. Color pixels of the same color means pairs of the color pixels (R, G, B) coinciding with each other. The moire occurs in a similar way also in a case of displaying a two-dimensional image that is not a stereoscopic image.

Accordingly, a description follows for a method for suppressing the moire in the case where the color pixels of the two-dimensional display 11 are of the three colors (R, G, B), and α0 is any of 7 and 8 and 11.

Expression (4) can be modified as in the following Expression (11) since δ is equal to Lx/px (δ=Lx/px).

$$\tan \theta = -(\alpha - \delta)/\beta \cdot (px/py) \qquad (11)$$

Here, in the case where the integer α0 that minimizes GH of Expression (5) is set at any of 7, 8 and 11, which are not the multiples of 3 (=D), preferably, the inclination angle θ of the lens and the parameter δ=Lx/px are set within the following ranges. The inclination angle θ and the parameter δ are set within the following ranges, whereby the moire can be suppressed, which occurs depending on the relationship between the color pixels of the same color and the lenticular sheet, and on the relationship between the black stripes of the two-dimensional display 11 and the lenticular sheet 14.

A description follows for a first preferred range in the case where α0 is set equal to 7 (α0=7). When α0 is equal to 7, β0 becomes equal to −1 (β0=−1). In the case of α0=7 and β0=−1, tan θ becomes equal to (7−δ)·(px/py) (tan θ=(7−δ)·(px/py)). At this time, δ is set as 5.3≤δ≤5.4. That is to say, preferably, Expression (7) is satisfied.

$$\tan\theta=(7-\delta)\cdot(px/py) \text{ and } 5.3\le\delta\le5.4 \qquad (7)$$

As understood from results of simulations to be described later, δ is set as 5.3≤δ≤5.4, whereby the moire can be suppressed.

A description follows for a second preferred range in the case where α0 is set equal to 8 (α0=8). When α0 is equal to 8, β0 becomes equal to −2 (β0=−2). In the case of α0=8 and β0=−2, tan θ becomes equal to 0.5·(8−δ)·(px/py) (tan θ=0.5·(8−δ)·(px/py)). At this time, δ is set as 5.1≤δ≤5.4. That is to say, preferably, Expression (8) is satisfied.

$$\tan\theta=0.5\cdot(8-\delta)\cdot(px/py) \text{ and } 5.1\le\delta\le5.4 \qquad (8)$$

As understood from results of simulations to be described later, δ is set as 5.1≤δ≤5.4, whereby the moire can be suppressed.

A description follows for a third preferred range in the case where α0 is set equal to 11 (α0=11). When α0 is equal to 11, β0 becomes equal to −2 (β0=−2). In the case of α0=11 and β0=−2, tan θ becomes equal to 0.5·(11−δ)·(px/py) (tan θ=0.5·(11−δ)·(px/py)). At this time, δ is set as 8.6≤δ≤8.7. That is to say, preferably, Expression (9) is satisfied.

$$\tan\theta=0.5\cdot(11-\delta)\cdot(px/py) \text{ and } 8.6\le\delta\le8.7 \qquad (9)$$

As understood from results of simulations to be described later, δ is set as 8.6≤δ≤8.7, whereby the moire can be suppressed.

Here, the fact that the moire is suppressed in the first to third preferred ranges is described by using the simulation results. First, FIGS. 11A and 11B to FIGS. 16A and 16B and FIG. 17 show the simulation results in the first preferred range.

FIGS. 11A and 11B to FIGS. 16A and 16B show states where the plurality of color pixels 13 seen through the lenticular sheet 14 are magnified. FIG. 11A, FIG. 12A, FIG. 13A, FIG. 14A, FIG. 15A and FIG. 16A show whether or not the moire occurs depending on the colors R, G and B. Here, for the purpose of facilitating the understanding, G is represented white, and R and B are represented black. Black portions in FIG. 11A, FIG. 12A, FIG. 13A, FIG. 14A, FIG. 15A and FIG. 16A are portions of R and B or portions of the black stripes.

FIG. 11B, FIG. 12B, FIG. 13B, FIG. 14B, FIG. 15B and FIG. 16B show whether or not the moire occurs depending on the luminance. FIG. 11B, FIG. 12B, FIG. 13B, FIG. 14B, FIG. 15B and FIG. 16B display white with predetermined luminance in such a manner that signals at predetermined levels are displayed individually for R, G and B in a state where color filters are detached. Black portions in FIG. 11B, FIG. 12B, FIG. 13B, FIG. 14B, FIG. 15B and FIG. 16B are the portions of the black stripes.

Figure 11A:
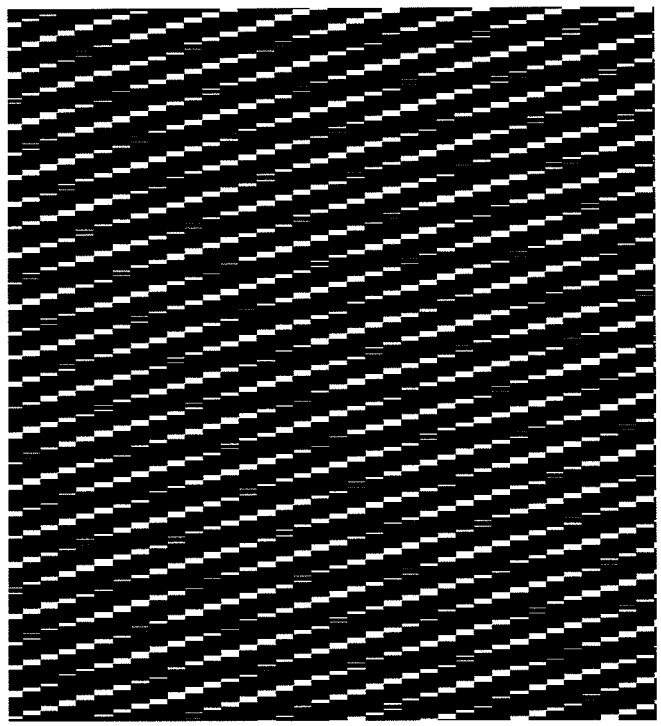
FIG. 11A is a view showing a simulation result as to whether or not moire occurs on color in a case where the inclination angle θ, the horizontal pixel pitch px and a vertical pixel pitch py have a relationship of $\tan\theta = (7-\delta) \cdot (px/py)$, and where δ=5.1.
Figure 11B:
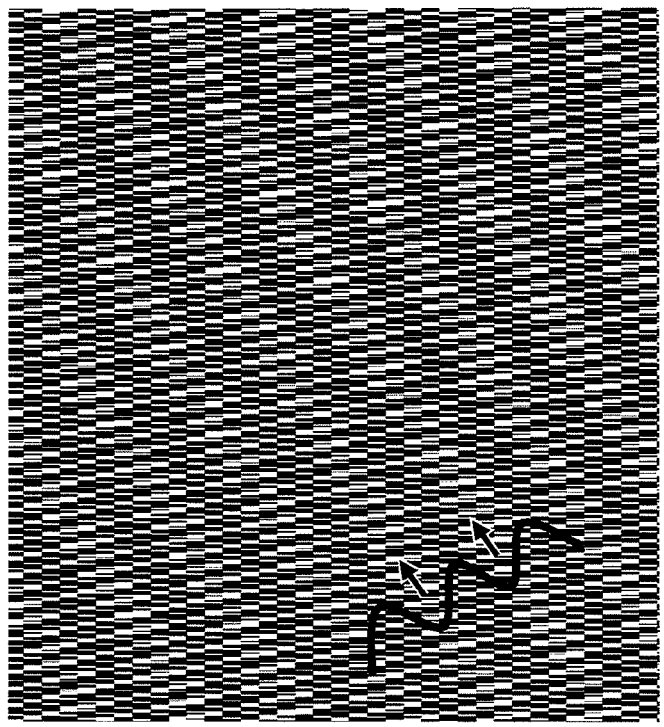
FIG. 11B is a view showing a simulation result as to whether or not the moire occurs on luminance in the case where the inclination angle θ, the horizontal pixel pitch px and the vertical pixel pitch py have the relationship of tan θ=(7−δ)·(px/py), and where δ=5.1.

In the case of δ=5.0, the horizontal lens pitch Lx becomes the integral multiple of the horizontal pixel pitch px since δ is equal to Lx/px (δ=Lx/px). Hence, δ=5.0 is unacceptable. FIG. 11A and FIG. 11B show the case of δ=5.1. The moire does not occur on the color shown in FIG. 11A; however, the moire occurs on the luminance shown in FIG. 11B. Here, for the purpose of facilitating the understanding, a state where the moire occurs is shown by a wavy line. Portions along directions shown by arrows indicate portions darkened by the moire.

Figure 12A:
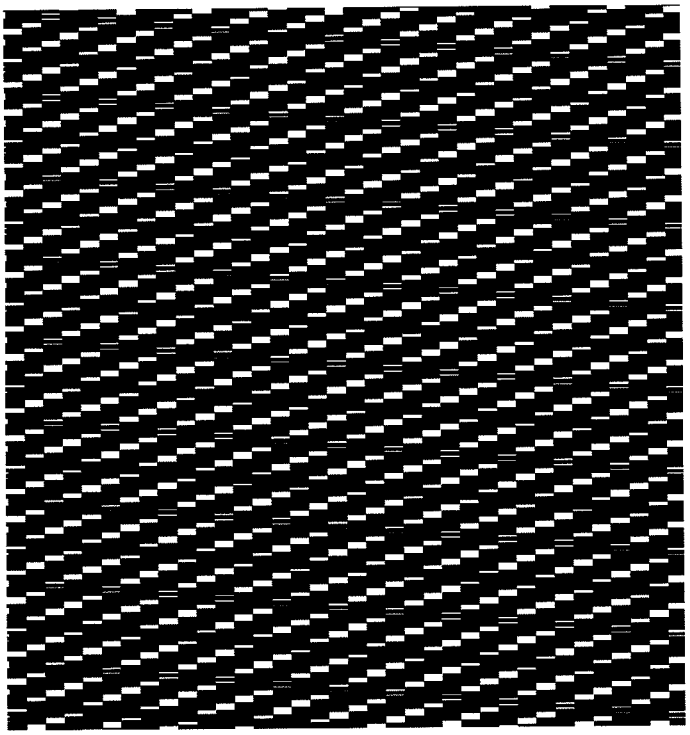
FIG. 12A is a view showing a simulation result as to whether or not the moire occurs on the color in a case where tan θ=(7−δ)·(px/py) and δ=5.2.
Figure 12B:
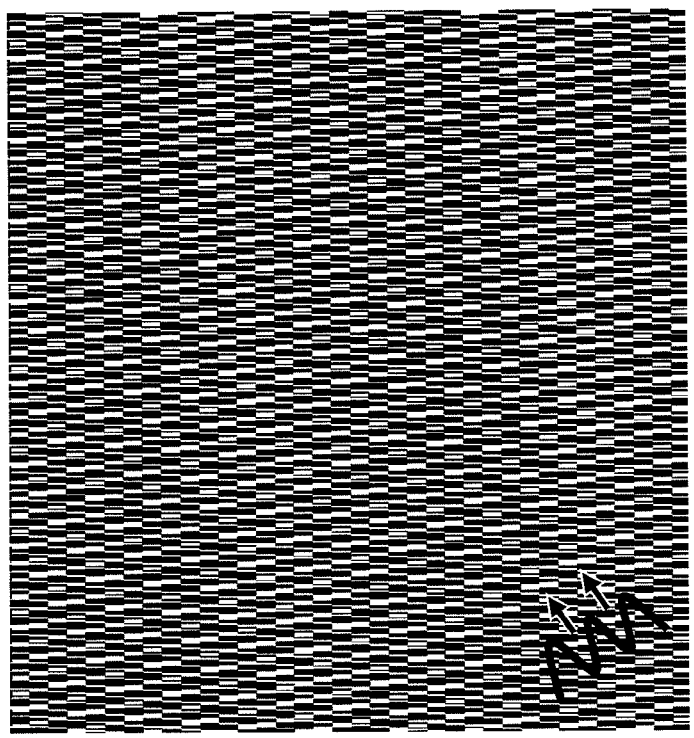
FIG. 12B is a view showing a simulation result as to whether or not the moire occurs on the luminance in the case where tan θ=(7−δ)·(px/py) and δ=5.2.

FIG. 12A and FIG. 12B show the case of δ=5.2. In a similar way to FIG. 11A and FIG. 11B, the moire does not occur on the color shown in FIG. 12A; however, the moire occurs on the luminance shown in FIG. 12B.

Figure 14A:
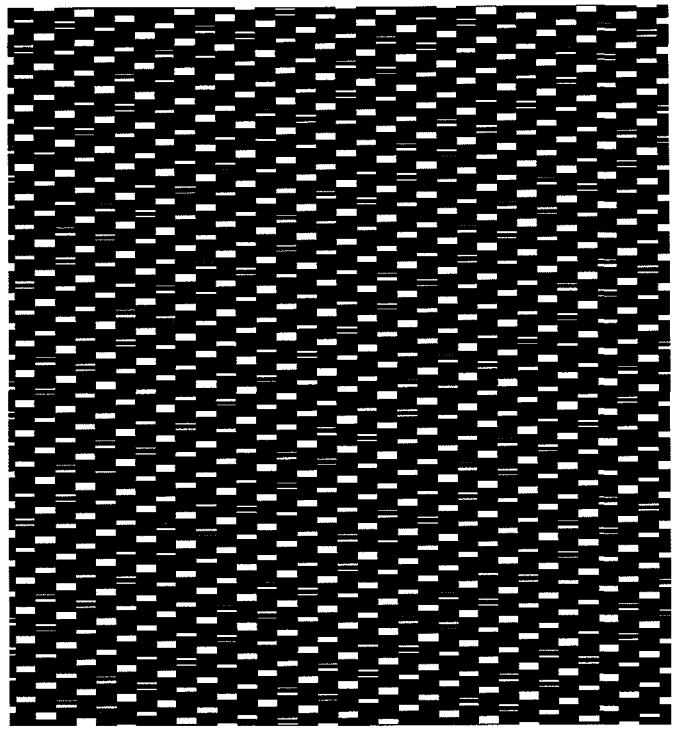
FIG. 14A is a view showing a simulation result as to whether or not the moire occurs on the color in a case where tan θ=(7−δ)·(px/py) and δ=5.4.
Figure 14B:
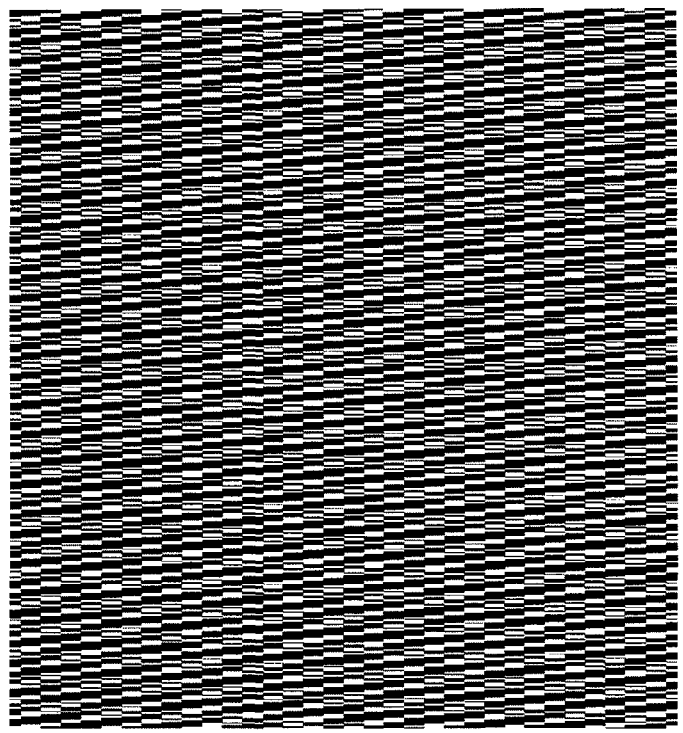
FIG. 14B is a view showing a simulation result as to whether or not the moire occurs on the luminance in the case where tan θ=(7−δ)·(px/py) and δ=5.4.

FIG. 13A and FIG. 13B show the case of δ=5.3. As understood from FIG. 13A and FIG. 13B, the moire does not occur on either of the color or the luminance. FIG. 14A and FIG. 14B show the case of δ=5.4. As understood from FIG. 14A and FIG. 14B, the moire does not occur on either of the color or the luminance.

Figure 16A:
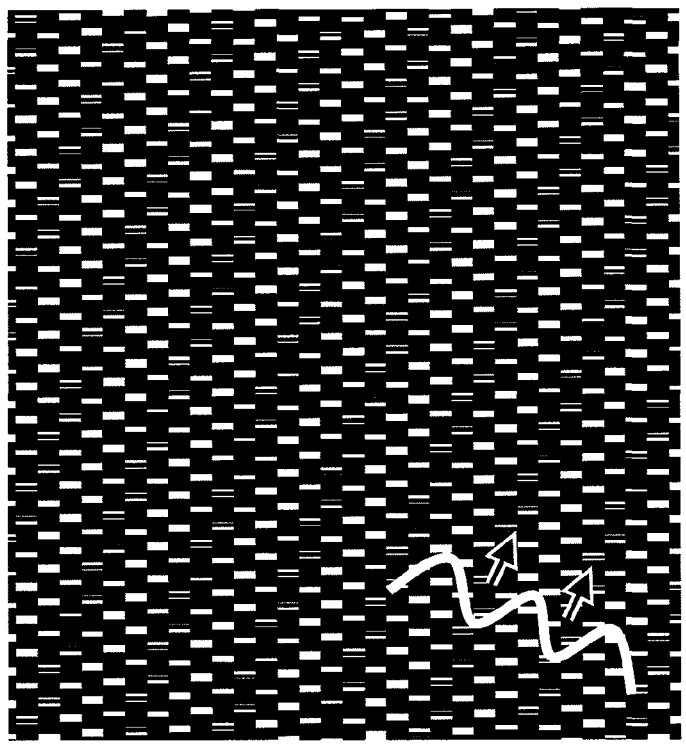
FIG. 16A is a view showing a simulation result as to whether or not the moire occurs on the color in a case where tan θ=(7−δ)·(px/py) and δ=5.6.
Figure 16B:
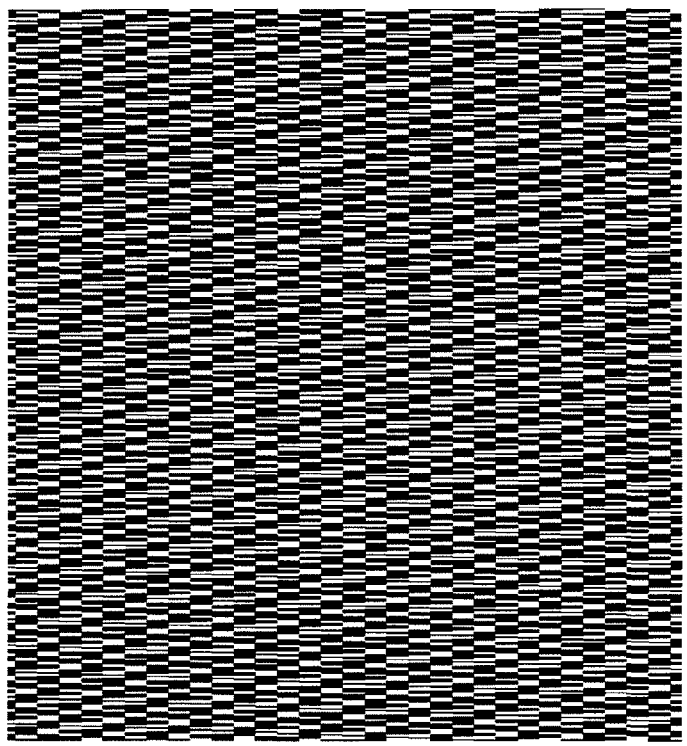
FIG. 16B is a view showing a simulation result as to whether or not the moire occurs on the luminance in the case where tan θ=(7−δ)·(px/py) and δ=5.6.
Figure 18A:
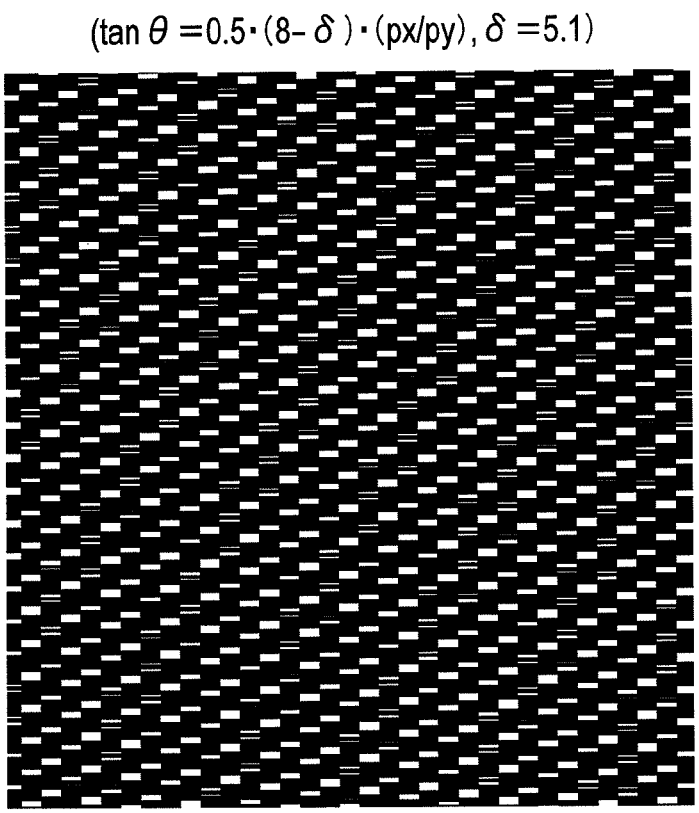
FIG. 18A is a view showing a simulation result as to whether or not the moire occurs on the color in a case where the inclination angle θ, the horizontal pixel pitch px and the vertical pixel pitch py have a relationship of tan θ=0.5·(8−δ)·(px/py), and where δ=5.1.
Figure 18B:
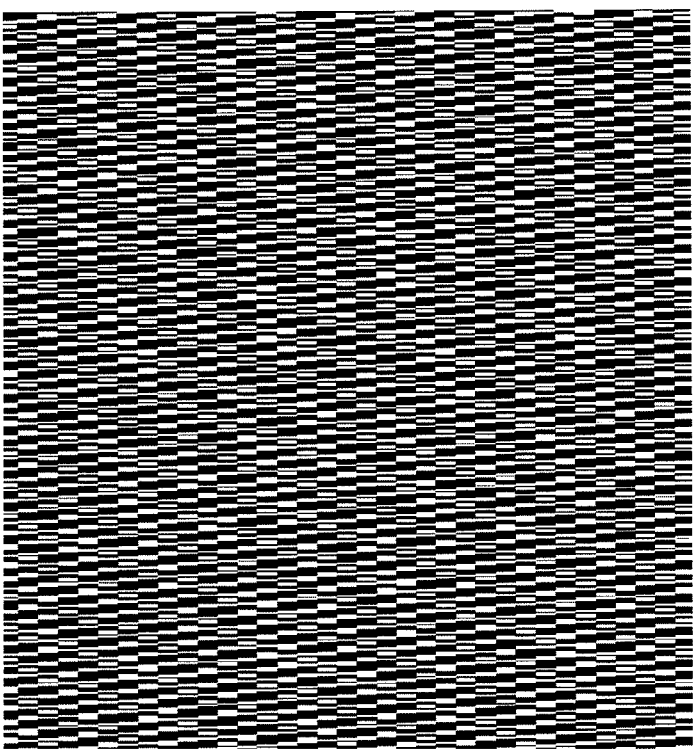
FIG. 18B is a view showing a simulation result as to whether or not the moire occurs on the luminance in the case where the inclination angle θ, the horizontal pixel pitch px and the vertical pixel pitch py have the relationship of tan θ=0.5·(8−δ)·(px/py), and where δ=5.1.
Figure 19A:
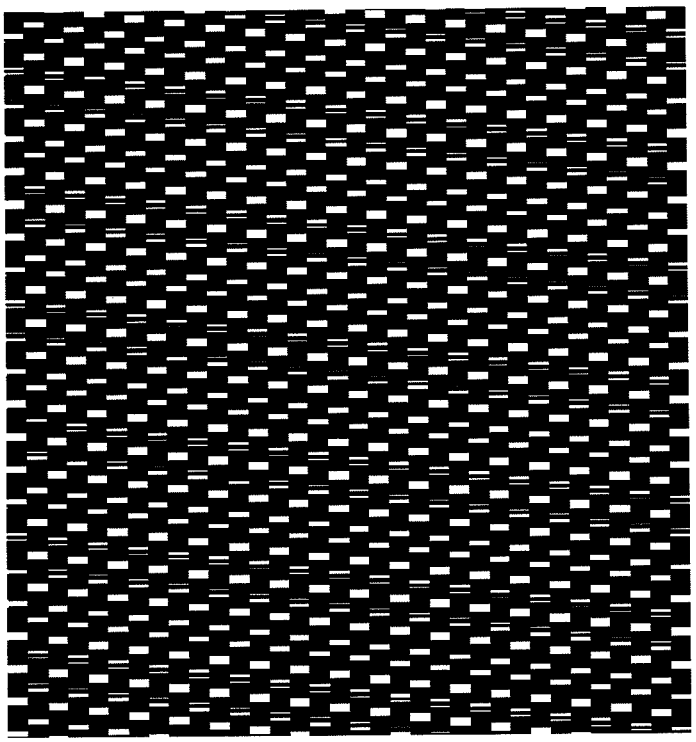
FIG. 19A is a view showing a simulation result as to whether or not the moire occurs on the color in a case where tan θ=0.5·(8−δ)·(px/py) and δ=5.2.
Figure 19B:
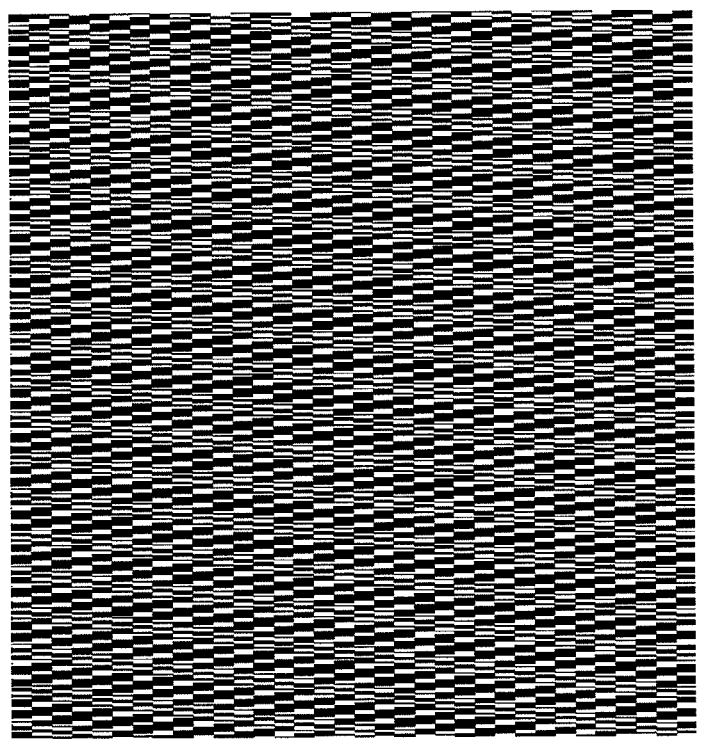
FIG. 19B is a view showing a simulation result as to whether or not the moire occurs on the luminance in the case where tan θ=0.5·(8−δ)·(px/py) and δ=5.2.
Figure 20A:
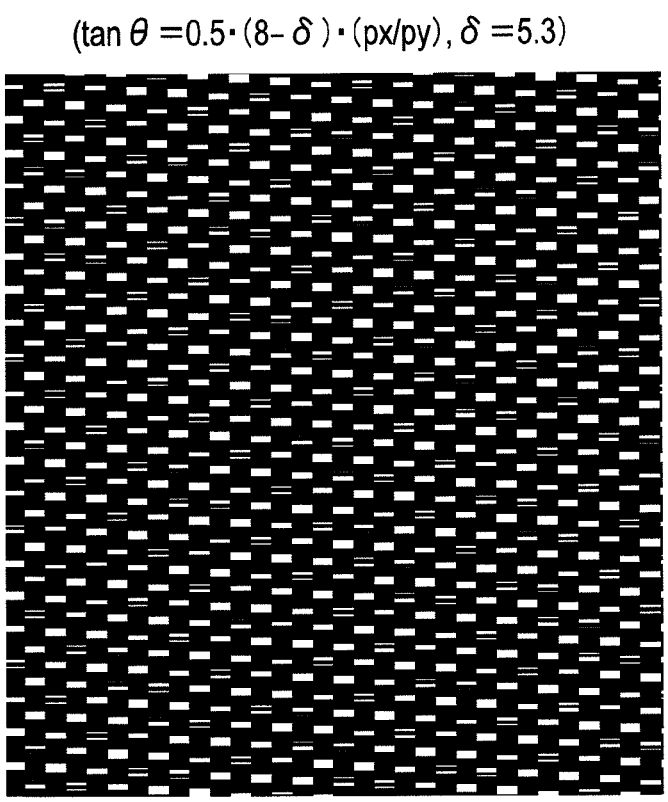
FIG. 20A is a view showing a simulation result as to whether or not the moire occurs on the color in a case where tan θ=0.5·(8−δ)·(px/py) and δ=5.3.
Figure 20B:
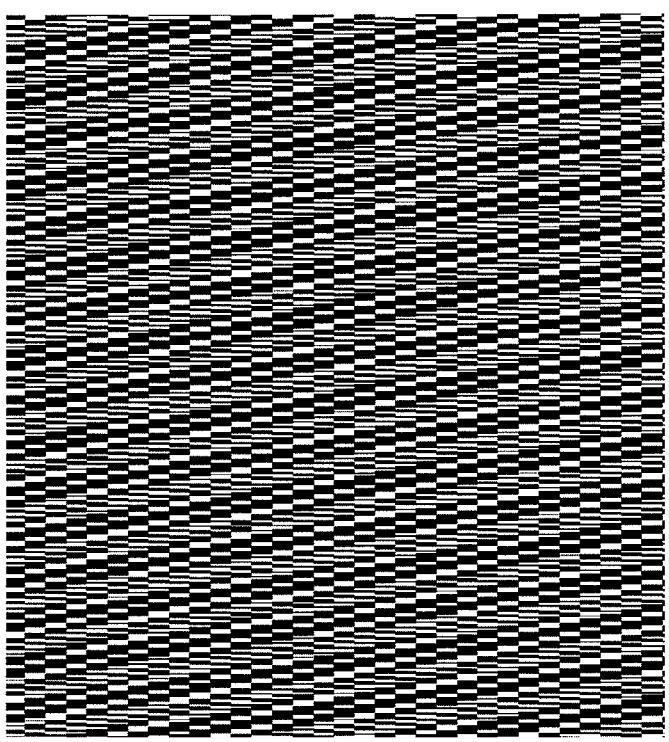
FIG. 20B is a view showing a simulation result as to whether or not the moire occurs on the luminance in the case where tan θ=0.5·(8−δ)·(px/py) and δ=5.3.
Figure 21A:
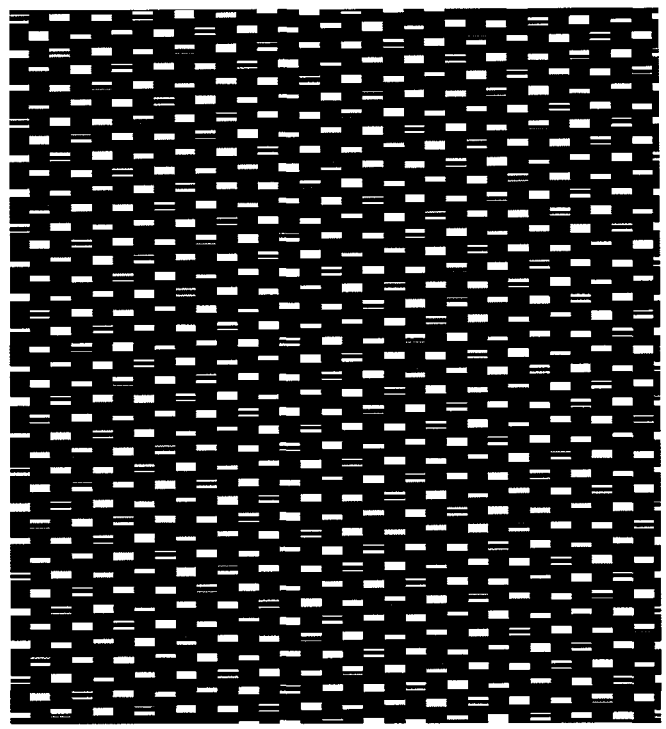
FIG. 21A is a view showing a simulation result as to whether or not the moire occurs on the color in a case where tan θ=0.5·(8−δ)(px/py) and δ=5.4.
Figure 21B:
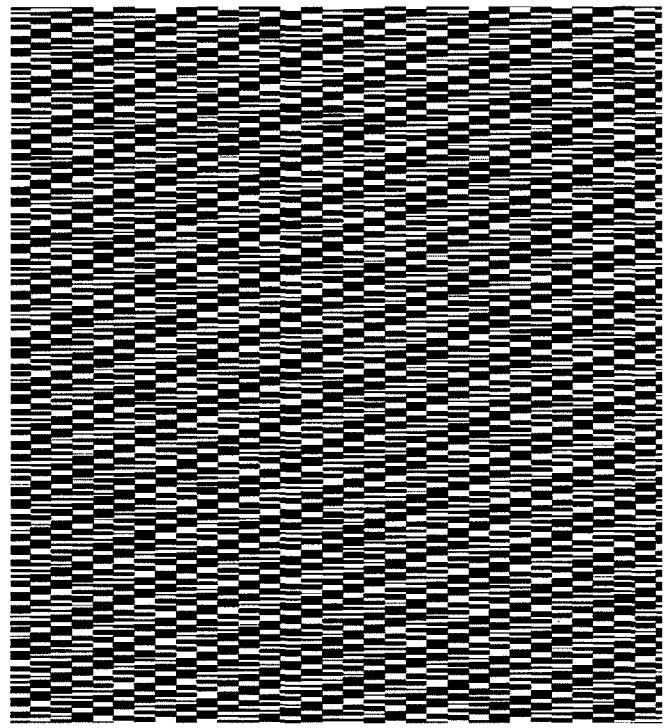
FIG. 21B is a view showing a simulation result as to whether or not the moire occurs on the luminance in the case where tan θ=0.5·(8−δ)·(px/py) and δ=5.4.

FIG. 15A and FIG. 15B show the case of δ=5.5. In the case of δ=5.5, the moire does not occur on the luminance shown in FIG. 15B; however, the moire occurs on the color shown in FIG. 15A. FIG. 16A and FIG. 16B show the case of δ=5.6. In a similar way to the case of δ=5.5 in FIG. 15A and FIG. 15B, in the case of δ=5.6, the moire does not occur on the luminance shown in FIG. 16B; however, the moire occurs on the color shown in FIG. 16A. As mentioned above, FIG. 15A and FIG. 16A show moire of G, and moire occurs also on R and B in a similar way.

The above-described results of the simulations in the case of the first preferred range are summarized as shown in FIG. 17. It is understood that 5.3≤δ≤5.4 is preferable.

Next, by using FIGS. 18A and 18B to FIGS. 22A and 22B and FIG. 23, a description follows of the simulation results in the second preferred range. In a similar way to FIG. 11A, FIG. 12A, FIG. 13A, FIG. 14A, FIG. 15A and FIG. 16A, FIG. 18A, FIG. 19A, FIG. 20A, FIG. 21A and FIG. 22A show whether or not the moire occurs depending on the colors R, G and B. In a similar way to FIG. 11B, FIG. 12B, FIG. 13B, FIG. 14B, FIG. 15B and FIG. 16B, FIG. 18B, FIG. 19B, FIG. 20B, FIG. 21B and FIG. 22B show whether or not the moire occurs depending on the luminance.

Figure 22A:
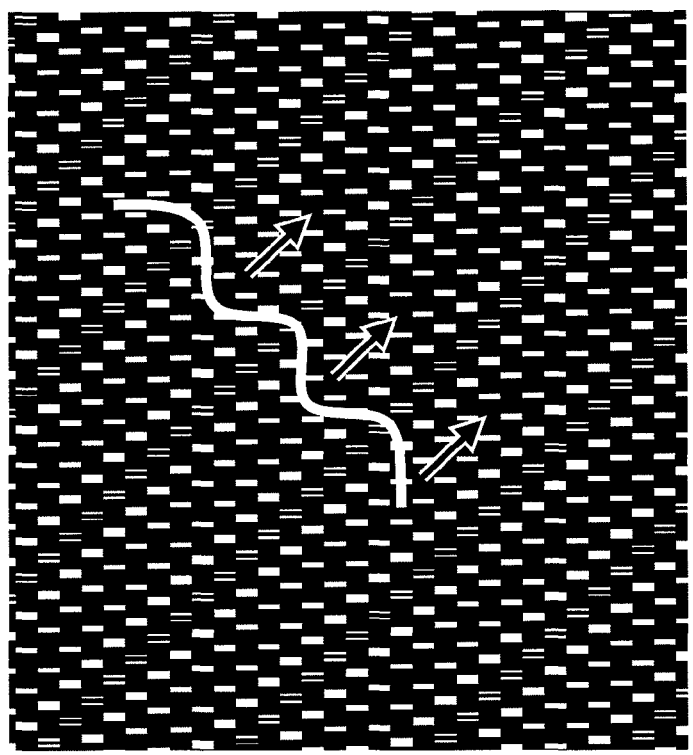
FIG. 22A is a view showing a simulation result as to whether or not the moire occurs on the color in a case where tan θ=0.5·(8−δ)·(px/py) and δ=5.5.
Figure 22B:
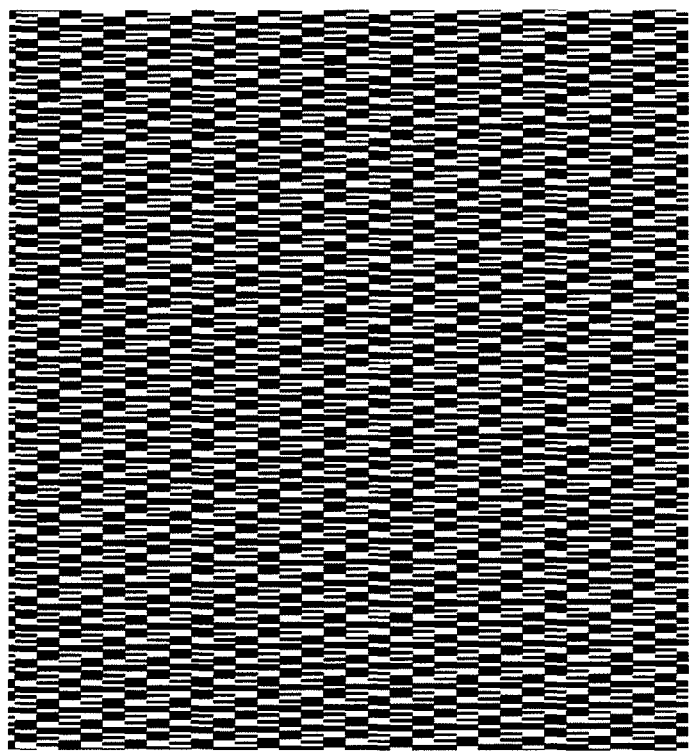
FIG. 22B is a view showing a simulation result as to whether or not the moire occurs on the luminance in the case where tan θ=0.5·(8−δ)·(px/py) and δ=5.5.

In the case of δ=5.0, the horizontal lens pitch Lx becomes the integral multiple of the horizontal pixel pitch px, and accordingly, δ=5.0 is unacceptable. FIGS. 18A and 18B to FIGS. 21A to 21B show the cases of δ=5.1 to 5.4, respectively. As understood from FIGS. 18A and 18B to FIGS. 21A to 21B, the moire does not occur on either of the color or the luminance. FIGS. 22A and 22B show the case of δ=5.5. The moire does not occur on the luminance shown in FIG. 22B; however, the moire occurs on the color shown in FIG. 22A.

The above-described results of the simulations in the case of the second preferred range are summarized as shown in FIG. 23. It is understood that 5.1≤δ≤5.4 is preferable.

Moreover, by using FIGS. 24A and 24B to FIGS. 28A and 28B and FIG. 29, a description follows of the simulation results in the third preferred range. In a similar way to FIG. 11A, FIG. 12A, FIG. 13A, FIG. 14A, FIG. 15A and FIG. 16A, FIG. 24A, FIG. 25A, FIG. 26A, FIG. 27A and FIG. 28A show whether or not the moire occurs depending on the colors R, G and B. In a similar way to FIG. 11B, FIG. 12B, FIG. 13B, FIG. 14B, FIG. 15B and FIG. 16B, FIG. 24B, FIG. 25B, FIG. 26B, FIG. 27B and FIG. 28B show whether or not the moire occurs depending on the luminance.

Figure 24A:
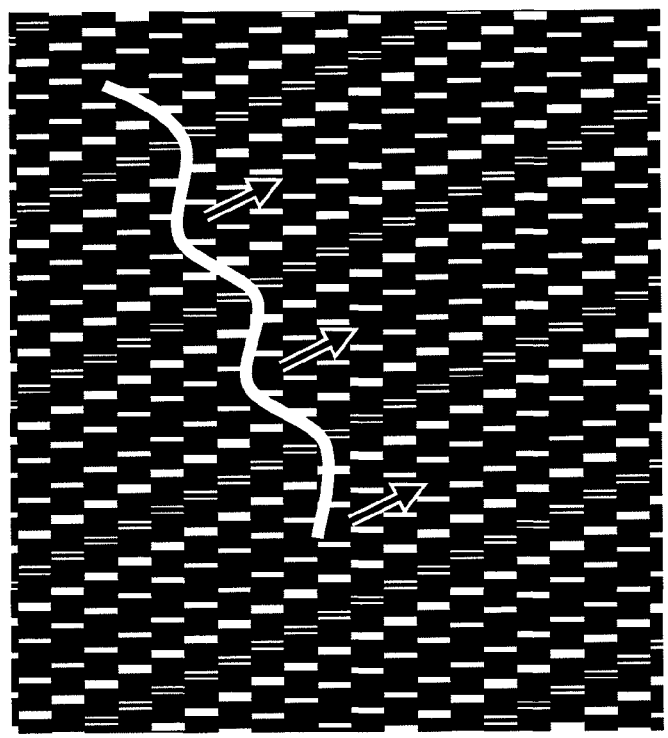
FIG. 24A is a view showing a simulation result as to whether or not the moire occurs on the color in a case where the inclination angle θ, the horizontal pixel pitch px and the vertical pixel pitch py have a relationship of tan θ=0.5·(11−δ)·(px/py), and where δ=8.5.
Figure 24B:
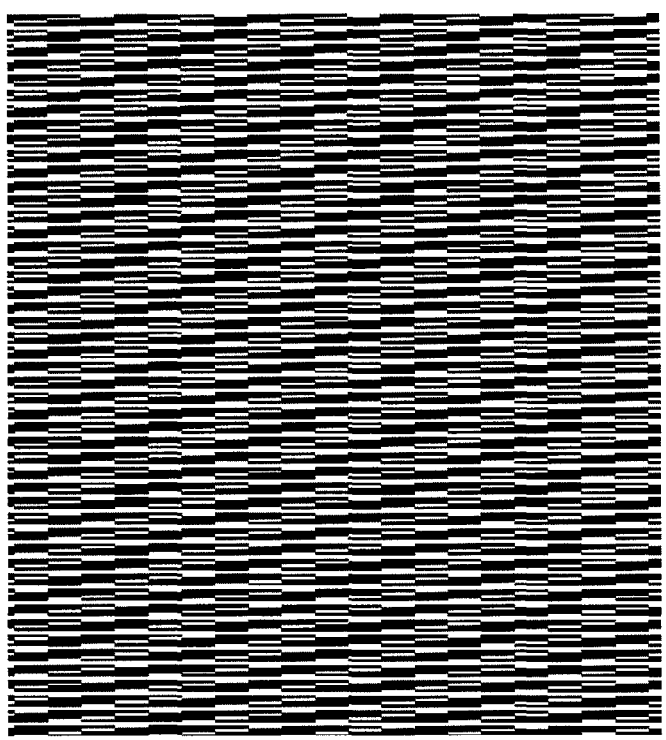
FIG. 24B is a view showing a simulation result as to whether or not the moire occurs on the luminance in the case where the inclination angle θ, the horizontal pixel pitch px and the vertical pixel pitch py have the relationship of tan θ=0.5·(11−δ)·(px/py), and where δ=8.5.
Figure 25A:
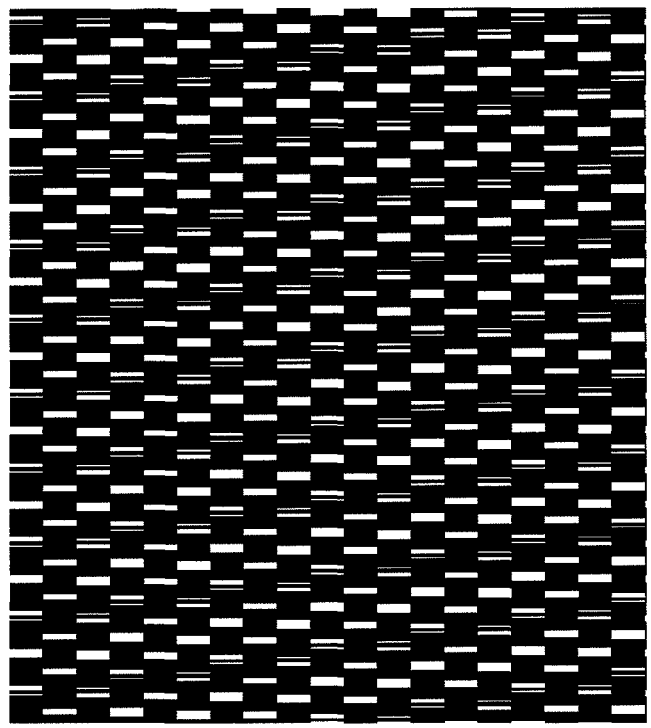
FIG. 25A is a view showing a simulation result as to whether or not the moire occurs on the color in a case where tan θ=0.5·(11−δ)·(px/py) and δ=8.6.
Figure 25B:
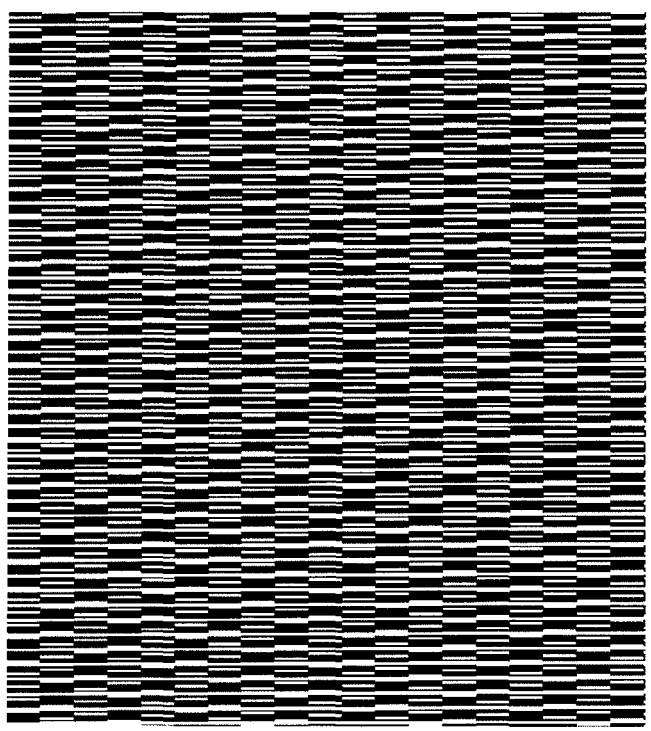
FIG. 25B is a view showing a simulation result as to whether or not the moire occurs on the luminance in the case where tan θ=0.5·(11−δ)·(px/py) and δ=8.6.
Figure 26A:
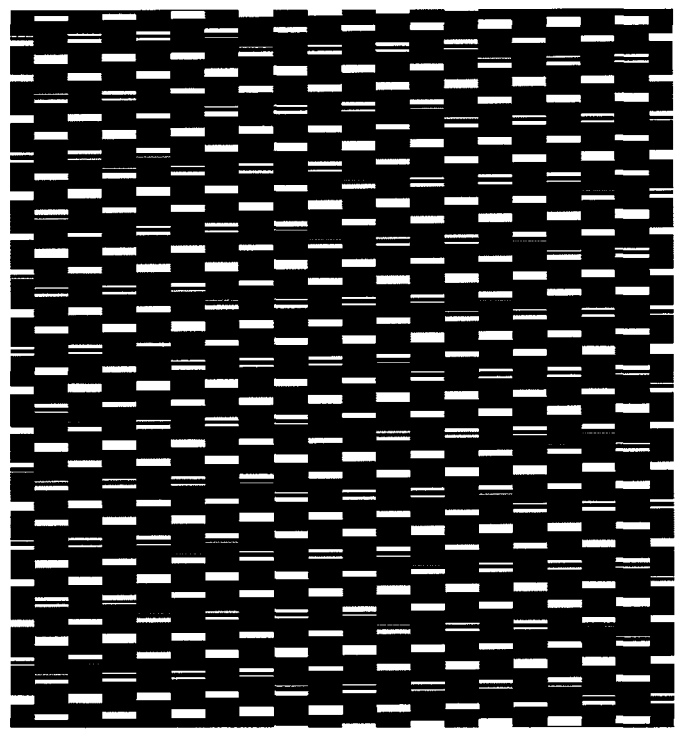
FIG. 26A is a view showing a simulation result as to whether or not the moire occurs on the color in a case where tan θ=0.5·(11−δ)·(px/py) and δ=8.7.
Figure 26B:
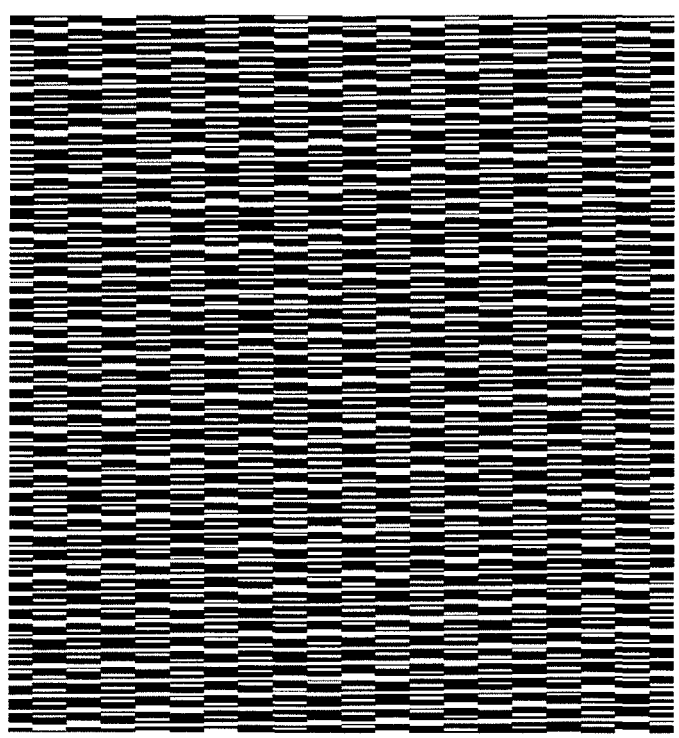
FIG. 26B is a view showing a simulation result as to whether or not the moire occurs on the luminance in the case where tan θ=0.5·(11−δ)·(px/py) and δ=8.7.

FIG. 24A and FIG. 24B show the case of δ=8.5. The moire does not occur on the luminance shown in FIG. 24B; however, the moire occurs on the colors shown in FIG. 24A. FIG. 25A and FIG. 25B show the case of δ=8.6, and FIG. 26A and FIG. 26B show the case of δ=8.7. As understood from FIG. 25A and FIG. 25B and FIG. 26A and FIG. 26B, the moire does not occur on either of the color or the luminance.

Figure 27A:
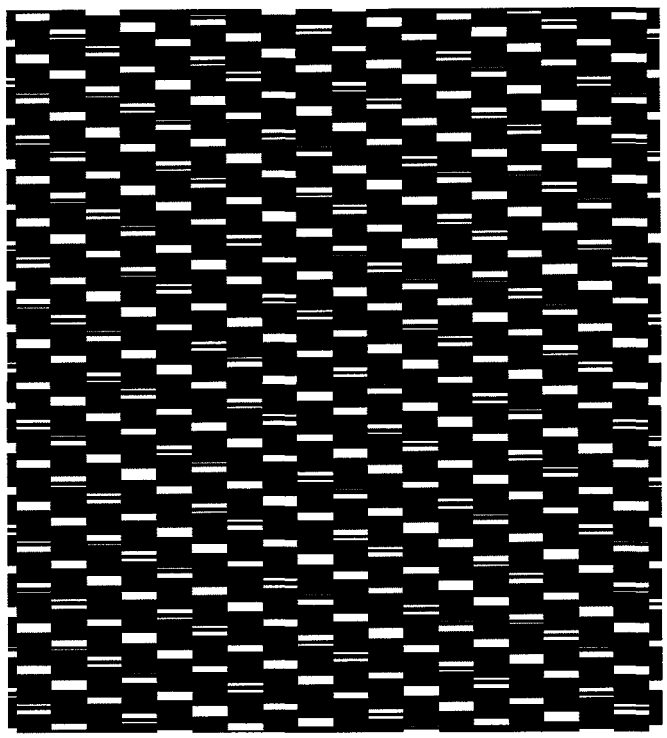
FIG. 27A is a view showing a simulation result as to whether or not the moire occurs on the color in a case where tan θ=0.5·(11−δ)·(px/py) and δ=8.8.
Figure 27B:
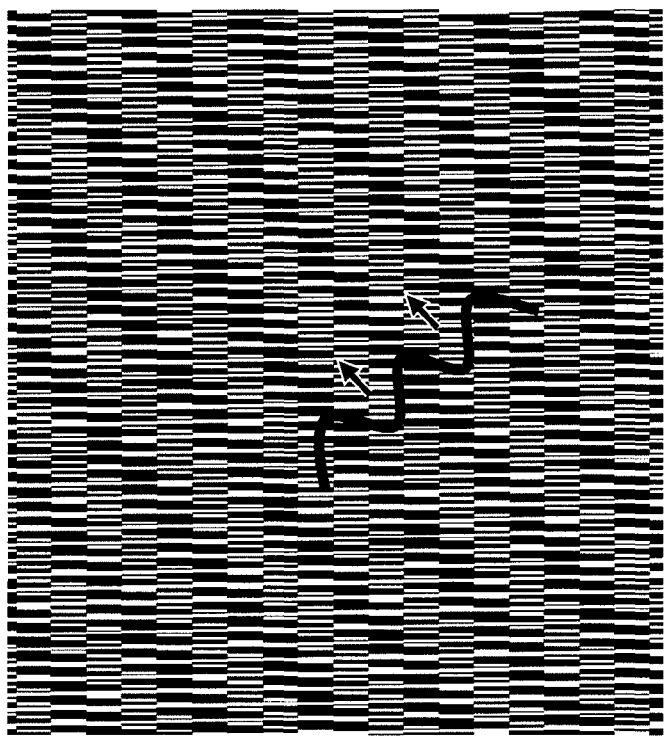
FIG. 27B is a view showing a simulation result as to whether or not the moire occurs on the luminance in the case where tan θ=0.5·(11−δ)·(px/py) and δ=8.8.

FIG. 27A and FIG. 27B show the case of δ=8.8. In the case of δ=8.8, the moire does not occur on the color shown in FIG.

Figure 28A:
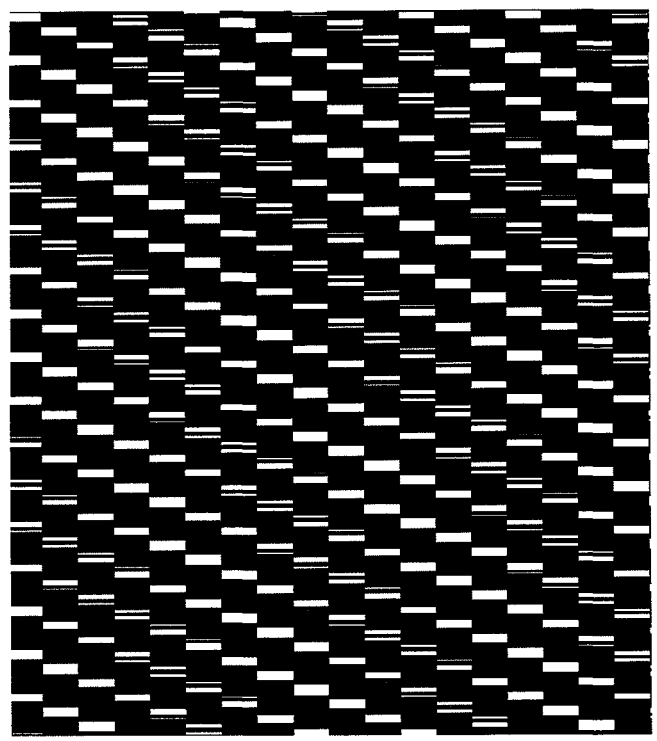
FIG. 28A is a view showing a simulation result as to whether or not the moire occurs on the color in a case where tan θ=0.5·(11−δ)·(px/py) and δ=8.9.
Figure 28B:
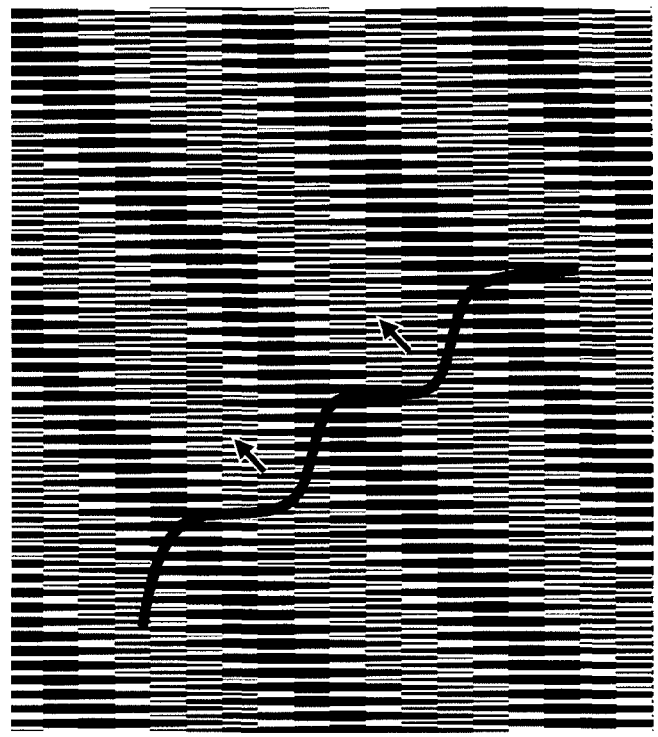
FIG. 28B is a view showing a simulation result as to whether or not the moire occurs on the luminance in the case where tan θ=0.5·(11−δ)·(px/py) and δ=8.9.

27A; however, the moire occurs on the luminance shown in FIG. 27B. FIG. 28A and FIG. 28B show the case of δ=8.9. In a similar way to FIG. 27A and FIG. 27B, in the case of δ=8.9, the moire does not occur on the color shown in FIG. 28A; however, the moire occurs on the luminance shown in FIG. 28B.

Figures 29, 30:
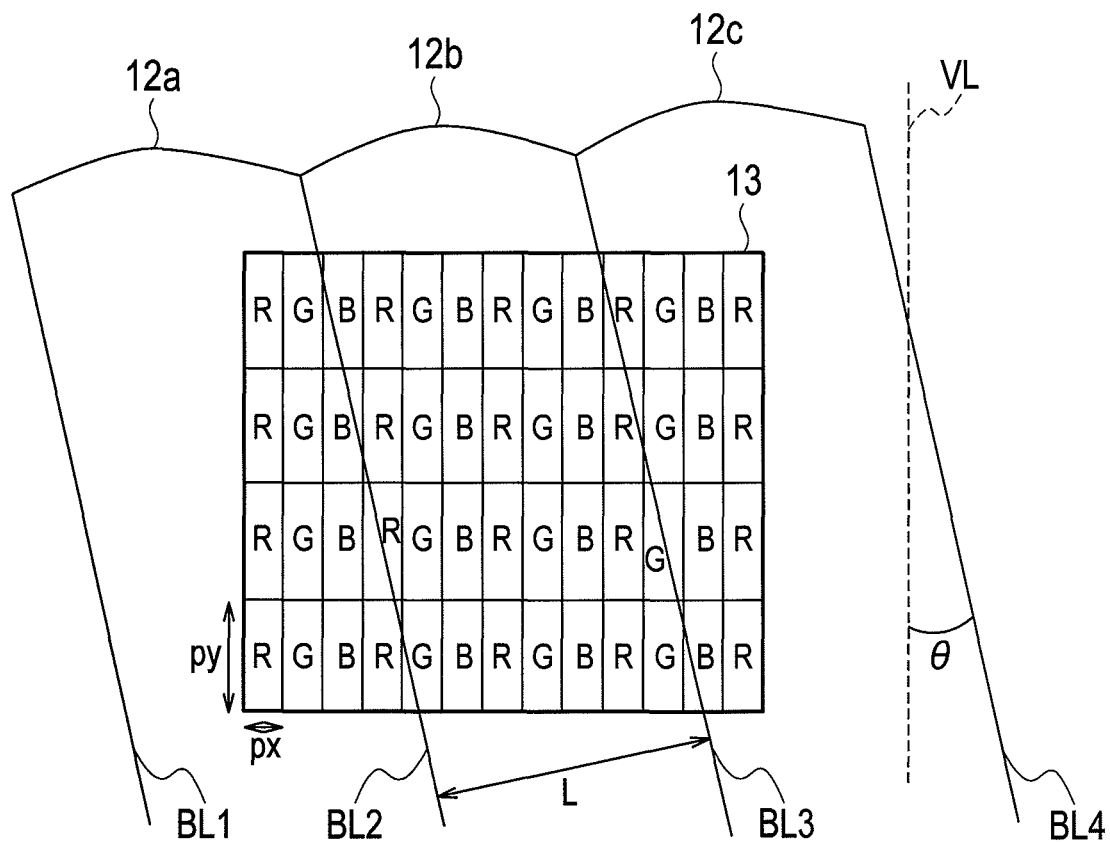
FIG. 29 is a view showing a summary of the simulation results in the case where tan θ=0.5·(11−δ)·(px/py).
FIG. 30 is a cross-sectional view showing a configuration of a naked-eye stereoscopic display apparatus of Example 1.

The above-described results of the simulations in the case of the third preferred range are summarized as shown in FIG. 29. It is understood that 8.6≤δ≤8.7 is preferable.

The reason why the moire is suppressed in the first to third preferred ranges is that all spatial frequencies are distributed uniformly at high frequencies in the screen. In accordance with this embodiment, tan θ>(px/py) is set, whereby such a pixel size increase due to the magnification effect of the cylindrical lenses 12 can be reduced, and the resolution feeling can also be enhanced.

Example 1

Based on the above, Example 1 of the embodiment is explained below. FIG. 30 is a plan view of a configuration of a naked-eye stereoscopic display apparatus of Example 1. FIG. 31 is a table showing values of respective parameters of the naked-eye stereoscopic display apparatus of FIG. 30. In a similar way to the naked-eye stereoscopic display apparatus of FIG. 5, color pixels are arrayed at predetermined pitches individually in the vertical direction and the horizontal direction. Moreover, color pixels of the same color are arrayed in the vertical direction, and color pixels of R, G and B are arrayed periodically in the horizontal direction.

A plurality of cylindrical lenses 12a, 12b, 12c . . . are arrayed in a single dimension in parallel to one another. Respective color pixels 13 are observed through the plurality of cylindrical lenses 12a, 12b, 12c . . . . Boundary lines BL1 to BL4 among the cylindrical lenses 12a to 12c are inclined at an inclination angle θ with respect to a vertical direction VL of a two-dimensional display 11. Note that a horizontal pixel pitch px is 0.1 mm, and a vertical pixel pitch py is 0.3 mm.

Here, as shown in FIG. 31, the inclination angle θ and a lens pitch L are set as θ=28.44° and L=0.473 mm. In Expression (1), Ax=13 and Ay=8 are satisfied, and a parameter Bx regarding the lens pitch satisfies Bx=8. Therefore, as well as Ay≥2 and Bx≥2 in Expression (3), the matter that Ay is an integral multiple of Bx and the matter that Ax/Ay≥1 are also satisfied. Moreover, Expression (4) and Expression (5) are satisfied by α0=7 and β0=−1. Furthermore, δ=5.375 is established by δ=Lx/px=L/(px·cos θ), and 5.3≤δ≤5.4 is satisfied.

Figure 32:
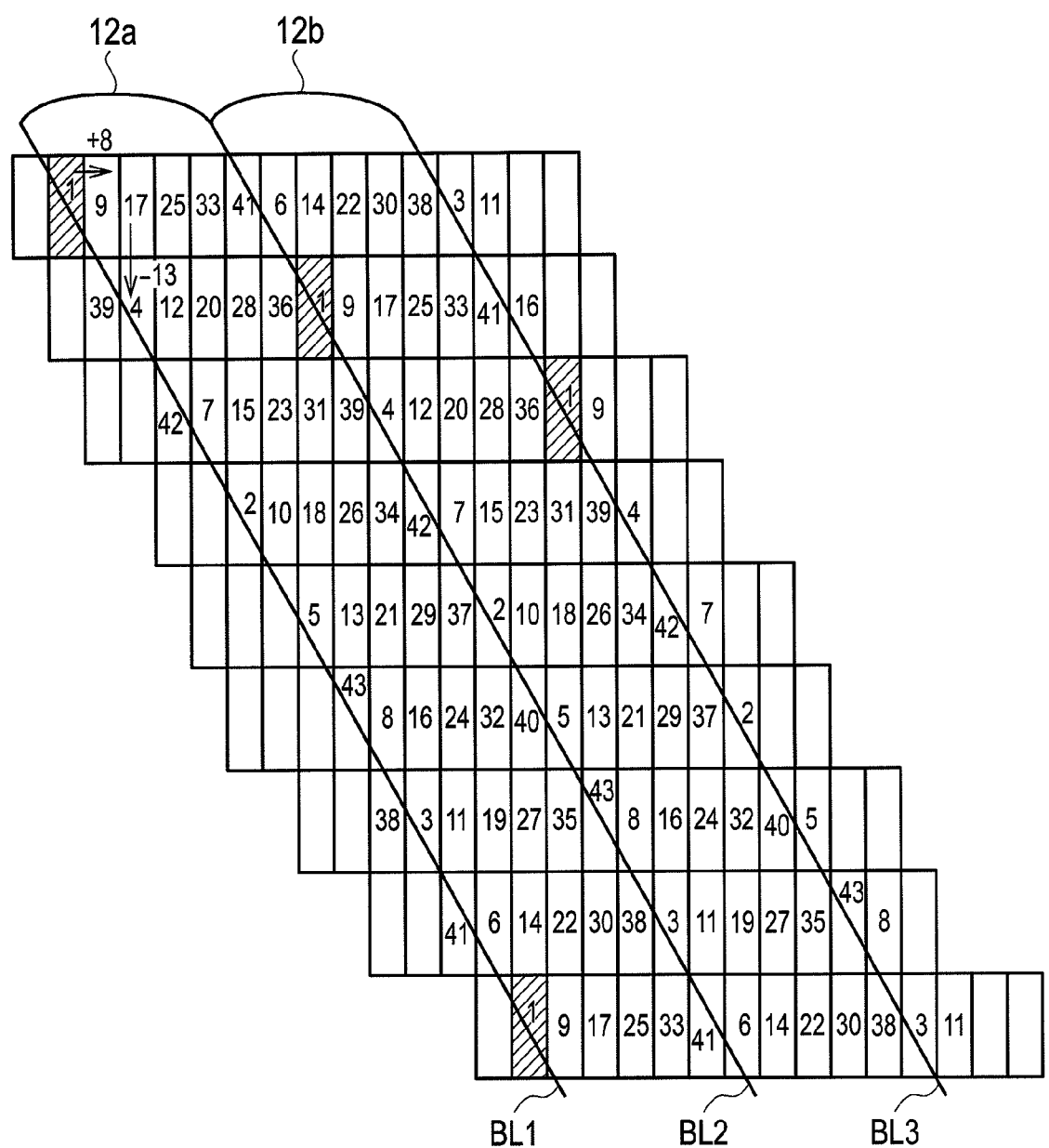
FIG. 32 is a view showing which parallax images respective color pixels present in Example 1.

FIG. 32 shows relative positions between the respective color pixels 13 and a lenticular sheet 14 (cylindrical lenses 12a and 12b) in Example 1, and which parallax images the respective color pixels 13 present therein. It can be confirmed that all of the parallax images (1 to 43) are presented on one cylindrical lens. That is to say, it is possible to suppress the oblique line-like noise. Moreover, it can be confirmed that color pixels which compose the same parallax image are present on lenses adjacent to each other, and that the color pixels 13 which correspond to the same parallax image on the cylindrical lenses adjacent to each other are spaced apart from each other by 7 pixels in the horizontal direction, and colors thereof are different from each other.

Hence, for adjacent cylindrical lenses, among the color pixels 13 corresponding to the same parallax image, the color pixels 13 of different colors are arrayed closer to each other than the color pixels of the same color, and uniform image quality free from the color unevenness can be realized.

Moreover, the moire can be suppressed since Expression (7) is satisfied.

Figure 4:
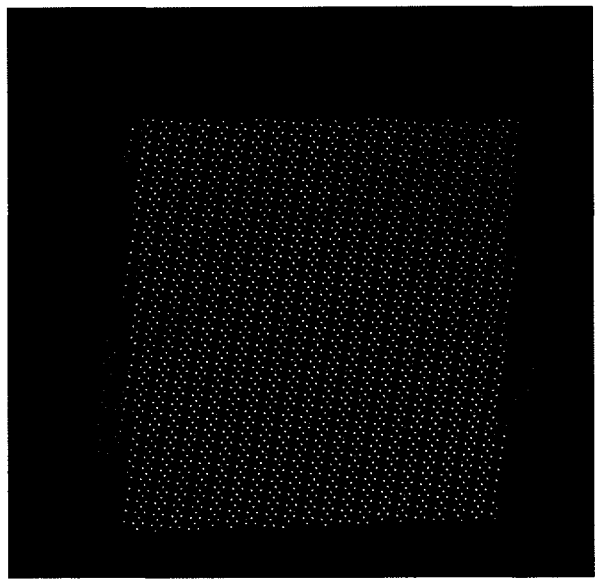
FIG. 4 is a view showing an example of the oblique line-like noise generated in parallel to the boundary lines of the lenticular lens.

In a similar way to FIG. 4, FIG. 33A and FIG. 33B are simulation images showing a state when the parallax images divided into 43 pieces are observed from one point through the cylindrical lenses 12. FIG. 33A shows a case where the lens pitch L is set at 0.473 mm and the parallax images are observed through the cylindrical lenses 12. From FIG. 33A, it is understood that the color unevenness and the oblique line-like noise do not appear.

Moreover, FIG. 33B shows a case where parallax images, which are reconstructed in accordance with the relative positions between the cylindrical lenses 12 and the color pixels 13 in consideration that the lens pitch L expands by 0.5%, are observed through the cylindrical lenses 12. It is understood that, although the parallax images are reconstructed, the oblique line-like noise that appears in FIG. 4 does not occur in FIG. 33B.

As described above, in accordance with Example 1, even in the case where the horizontal lens pitch Lx of the cylindrical lenses 12 is shifted from the integral multiple of the horizontal pixel pitch px, and the number of parallax images is increased without increasing the lens pitch L, the oblique line-like noise and the color unevenness can be suppressed from occurring. Moreover, even in the case where the parallax images are reconstructed in response to the change of the lens pitch L, the oblique line-like noise can be suppressed. Furthermore, the moire can be suppressed.

Example 2

A configuration of a naked-eye stereoscopic display apparatus of Example 2 is similar to that of FIG. 30. FIG. 34 is a table showing values of respective parameters of the naked-eye stereoscopic display apparatus according to Example 2.

As shown in FIG. 34, in Example 2, the inclination angle θ and the lens pitch L are set as θ=24.62° and L=0.477 mm. In Expression (1), Ax=11 and Ay=8 are satisfied, and the parameter Bx regarding the lens pitch satisfies Bx=4. Therefore, as well as Ay≥2 and Bx≥2 in Expression (3), the matter that Ay is an integral multiple of Bx and the matter that Ax/Ay≥1 are also satisfied. Moreover, Expression (4) and Expression (5) are satisfied by α0=8 and β0=−2. Furthermore, δ=5.25 is established by δ=Lx/px=L/(px·cos θ), and 5.1≤δ≤5.4 is satisfied.

Figure 35:
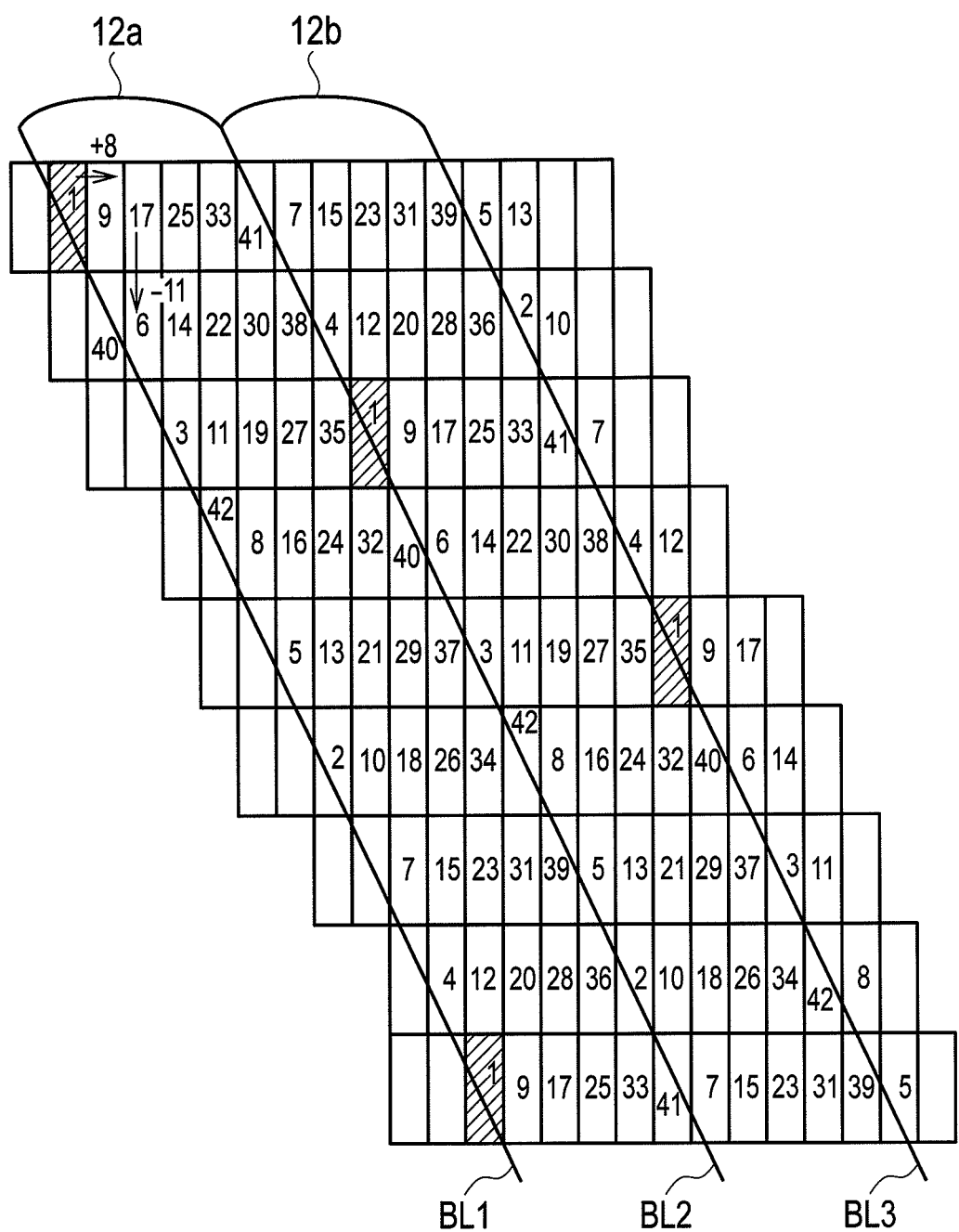
FIG. 35 is a view showing which parallax images the respective color pixels present in Example 2.

FIG. 35 shows relative positions between the respective color pixels 13 and the lenticular sheet 14 (cylindrical lenses 12a and 12b) in Example 2, and which parallax images the respective color pixels 13 present therein. It can be confirmed that all of the parallax images (1 to 42) are presented on one cylindrical lens. That is to say, it is possible to suppress the oblique line-like noise. Moreover, it can be confirmed that color pixels which compose the same parallax image are present on lenses adjacent to each other, and that the color pixels 13 which correspond to the same parallax image on the cylindrical lenses adjacent to each other are spaced apart from each other by 8 pixels in the horizontal direction, and colors thereof are different from each other.

Hence, for adjacent cylindrical lenses, among the color pixels 13 corresponding to the same parallax image, the color pixels 13 of different colors are arrayed closer to each other than the color pixels of the same color, and uniform image quality free from the color unevenness can be realized.

Moreover, the moire can be suppressed since Expression (8) is satisfied.

In a similar way to FIG. 4, FIG. 36A and FIG. 36B are simulation images showing a state when 42 parallax images are observed from one point through the cylindrical lenses 12. FIG. 36A shows a case where the lens pitch L is set at 0.477 mm and the parallax images are observed through the cylindrical lenses 12. From FIG. 36A, it is understood that the color unevenness and the oblique line-like noise do not appear.

Moreover, FIG. 36B shows a case where parallax images, which are reconstructed in accordance with the relative positions between the cylindrical lenses 12 and the color pixels 13 in consideration that the lens pitch L expands by 0.5%, are observed through the cylindrical lenses 12. It is understood that, although the parallax images are reconstructed, the oblique line-like noise that appears in FIG. 4 does not occur in FIG. 36B.

As described above, in accordance with Example 2, even in the case where the horizontal lens pitch Lx of the cylindrical lenses 12 is shifted from the integral multiple of the horizontal pixel pitch px, and the number of parallax images is increased without increasing the lens pitch L, the oblique line-like noise and the color unevenness can be suppressed from occurring. Moreover, even in the case where the parallax images are reconstructed in response to the change of the lens pitch L, the oblique line-like noise can be suppressed. Furthermore, the moire can be suppressed.

Example 3

A configuration of a naked-eye stereoscopic display apparatus of Example 3 is similar to that of FIG. 30. FIG. 37 is a table showing values of respective parameters of the naked-eye stereoscopic display apparatus according to Example 3.

As shown in FIG. 37, in Example 3, the inclination angle θ and the lens pitch L are set as θ=21.60° and L=0.802 mm. In Expression (1), Ax=19 and Ay=16 are satisfied, and the parameter Bx regarding the lens pitch satisfies Bx=8. Therefore, as well as Ay≥2 and Bx≥2 in Expression (3), the matter that Ay is an integral multiple of Bx and the matter that Ax/Ay≥1 are also satisfied. Moreover, Expression (6) and Expression (7) are satisfied by α0=11 and β0=−2. Furthermore, δ=8.625 is established by δ=Lx/px=L/(px·cos θ), and 8.6≤δ≤8.7 is satisfied.

Figure 38:
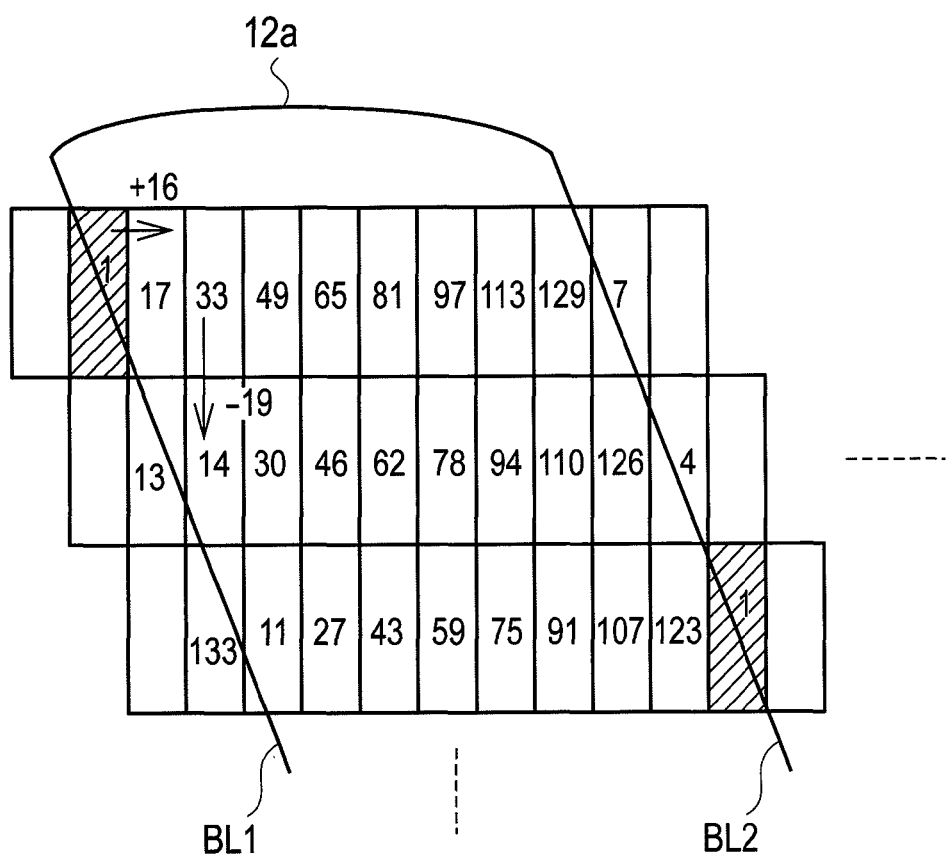
FIG. 38 is a view showing which parallax images the respective color pixels present in Example 3.

FIG. 38 shows relative positions between the respective color pixels 13 and the lenticular sheet 14 (cylindrical lens 12a) in Example 3, and which parallax images the respective color pixels 13 present therein. In Example 3, the number V of parallax images to be divided is 138, and therefore, FIG. 38 shows jump widths of the numbers among the color pixels adjacent to one another in order to avoid complexity of the drawing.

It can be confirmed that all of the parallax images (1 to 138) are presented on one cylindrical lens. That is to say, it is possible to suppress the oblique line-like noise. Moreover, it can be confirmed that color pixels which compose the same parallax image are present on lenses adjacent to each other, and that the color pixels 13 which correspond to the same parallax image on the cylindrical lenses adjacent to each other are spaced apart from each other by 11 pixels in the horizontal direction, and colors thereof are different from each other.

Hence, for adjacent cylindrical lenses, among the color pixels 13 corresponding to the same parallax image, the color pixels 13 of different colors are arrayed closer to each other than the color pixels of the same color, and uniform image quality free from the color unevenness can be realized.

Moreover, the moire can be suppressed since Expression (9) is satisfied.

Figure 39A:
FIGS. 39A and 39B are simulation images showing a state where 138 parallax images are observed from one point through the cylindrical lenses.
Figure 39B:
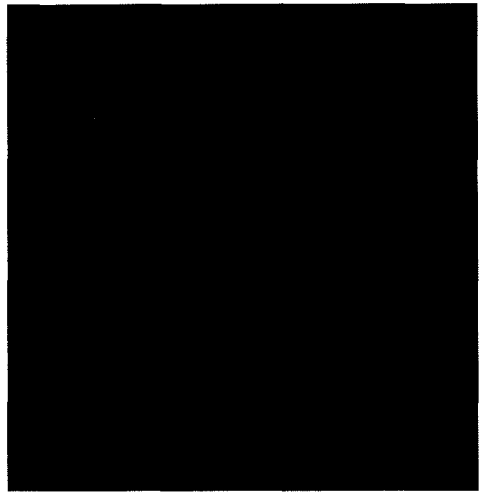

In a similar way to FIG. 4, FIG. 39A and FIG. 39B are simulation images showing a state when the parallax images divided into 138 pieces are observed from one point through the cylindrical lenses 12. FIG. 39A shows a case where the lens pitch L is set at 0.802 mm and the parallax images are observed through the cylindrical lenses 12. From FIG. 39A, it is understood that the color unevenness and the oblique line-like noise do not appear.

Moreover, FIG. 39B shows a case where parallax images, which are reconstructed in accordance with the relative positions between the cylindrical lenses 12 and the color pixels 13 in consideration that the lens pitch L expands by 0.5%, are observed through the cylindrical lenses 12. It is understood that, although the parallax images are reconstructed, the oblique line-like noise that appears in FIG. 4 does not occur in FIG. 39B.

As described above, in accordance with Example 3, even in the case where the horizontal lens pitch Lx of the cylindrical lenses 12 is shifted from the integral multiple of the horizontal pixel pitch px, and the number of parallax images is increased without increasing the lens pitch L, the oblique line-like noise and the color unevenness can be suppressed from occurring. Moreover, even in the case where the parallax images are reconstructed in response to the change of the lens pitch L, the oblique line-like noise can be suppressed. Furthermore, the moire can be suppressed.

As described above, in accordance with the naked-eye stereoscopic display apparatus of this embodiment, even in the case where the horizontal lens pitch of the lenticular lens is shifted from the integral multiple of the horizontal pixel pitch, and the plurality of parallax images are divided across the plurality of cylindrical lenses, the oblique line-like noise can be suppressed, and moreover, the moire can be suppressed.

The present invention is not limited to this embodiment nor Examples 1 to 3, which are described above, and is modifiable in various ways within the scope without departing from the spirit of the present invention. As the two-dimensional display 11, the liquid crystal display (LCD) and the color LCD display device are illustrated; however, two-dimensional displays other than these, for example, a cathode ray tube (CRT), a plasma display, electronic paper, an EL (electroluminescence) display, a projector and the like may be used.

What is claimed is:

1. A naked-eye stereoscopic display apparatus comprising:
 a two-dimensional display in which color pixels are arrayed individually in a horizontal direction and a vertical direction, and color pixels of a same color are arrayed in the vertical direction; and
 a lenticular sheet including a plurality of cylindrical lenses arrayed in parallel to one another, the lenticular sheet being arranged on the two-dimensional display so that viewpoint images displayed on the color pixels is observed through the cylindrical lenses,
 wherein, when a pixel pitch in the horizontal direction of the color pixels is defined as px, a pixel pitch in the vertical direction of the color pixels is defined as py, a lens pitch of the cylindrical lenses in a horizontal direction is defined as Lx, an inclination angle of boundary lines among the cylindrical lenses with respect to the vertical direction of the two-dimensional display is defined as θ, types of the color pixels are a natural number of 3 or more defined as D, Ax and Ay are integers prime to each other, and α and β are integers,
 then Expressions (1) to (5) are satisfied:

$$\theta = \arctan\{(Ax \cdot px)/(Ay \cdot py)\} \quad (1)$$

$$GF = Bx \cdot Lx/px \quad (2)$$

$$Ay \geq 2 \text{ and } Bx \geq 2 \quad (3)$$

$$Lx = \alpha \cdot px + \beta \cdot py \cdot \tan\theta \qquad (4)$$

$$GH = (\alpha \cdot px)^2 + (\beta \cdot py)^2 \qquad (5)$$

where Bx is a minimum natural number in which a numeric value GF shown in Expression (2) becomes an integer, and $\alpha 0$ is not a multiple of D where $\alpha 0$ is defined as the value of a that minimizes the numeric value GH shown in Expression (5), and when $\delta$ is defined as a number that satisfies Expression (6), then either Expression (7) or Expression (9) is satisfied:

$$Lx = \delta \cdot px \qquad (6)$$

$$\tan\theta = (7-\delta)\cdot(px/py) \text{ and } 5.3 \leq \delta \leq 5.4 \qquad (7)$$

$$\tan\theta = 0.5\cdot(11-\delta)\cdot(px/py) \text{ and } 8.6 \leq \delta \leq 8.7 \qquad (9).$$

* * * * *